(12) United States Patent
Watanabe

(10) Patent No.: US 11,787,335 B2
(45) Date of Patent: Oct. 17, 2023

(54) PERIPHERY MONITORING DEVICE

(71) Applicant: AISIN CORPORATION, Kariya (JP)

(72) Inventor: Kazuya Watanabe, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/936,627

(22) Filed: Jul. 23, 2020

(65) Prior Publication Data
US 2021/0023994 A1 Jan. 28, 2021

(30) Foreign Application Priority Data
Jul. 26, 2019 (JP) .................................. 2019-138054

(51) Int. Cl.
G06T 15/00 (2011.01)
B60R 1/00 (2022.01)
G06T 7/70 (2017.01)
G06T 19/20 (2011.01)

(52) U.S. Cl.
CPC ............... B60R 1/00 (2013.01); G06T 7/70 (2017.01); G06T 19/20 (2013.01); B60R 2300/10 (2013.01); B60R 2300/20 (2013.01); B60R 2300/607 (2013.01); G06T 2207/30252 (2013.01); G06T 2219/2016 (2013.01)

(58) Field of Classification Search
CPC ......... G06T 19/00; G06T 17/20; G06T 17/00; G06T 15/10; G06T 15/00
USPC ...................................................... 345/418
See application file for complete search history.

(56) References Cited

U.S. PATENT DOCUMENTS

| 10,592,713 B1* | 3/2020 | Shearin ................ G06K 9/3266 |
| 2005/0086000 A1* | 4/2005 | Tsuchiya ................ G08G 1/166 701/538 |
| 2005/0174429 A1* | 8/2005 | Yanai ........................ B60R 1/00 348/148 |
| 2006/0274147 A1 | 12/2006 | Chinomi et al. |
| 2010/0289632 A1* | 11/2010 | Seder ...................... G06V 10/95 382/104 |
| 2014/0152774 A1* | 6/2014 | Wakabayashi .......... G06T 3/005 348/46 |
| 2015/0210274 A1* | 7/2015 | Clarke ................... G08G 1/167 382/104 |
| 2018/0186287 A1 | 7/2018 | Hatakeyama et al. |
| 2018/0330619 A1 | 11/2018 | Shimizu |
| 2019/0005726 A1 | 1/2019 | Nakano et al. |

(Continued)

FOREIGN PATENT DOCUMENTS

| JP | 2007-295043 A | 11/2007 |
| JP | 2011-251681 A | 12/2011 |
| JP | 2013-144491 A | 7/2013 |

(Continued)

Primary Examiner — Gordon G Liu
(74) Attorney, Agent, or Firm — Sughrue Mion, PLLC

(57) ABSTRACT

A periphery monitoring device includes: an acquisition unit configured to acquire a captured image from an imaging unit that captures an image of a periphery of a vehicle and positional information regarding an attention area set around the vehicle; and a controller configured to superimpose and display an own vehicle image showing a position of the vehicle and an indicator indicating a position of the attention area based on the positional information on a peripheral image as a bird's-eye view image based on the captured image, and to perform display such that a display mode of the indicator changes over time.

10 Claims, 13 Drawing Sheets

(56) References Cited

U.S. PATENT DOCUMENTS

2020/0064471 A1* 2/2020 Gatland .............. H04N 13/388

FOREIGN PATENT DOCUMENTS

| | | |
|---|---|---|
| JP | 2017-105267 A | 6/2017 |
| JP | 2017-135695 A | 8/2017 |
| JP | 2018-109875 A | 7/2018 |
| JP | 2009-011017 A | 1/2019 |
| JP | 2019-004484 A | 1/2019 |
| JP | 2019-008474 A | 1/2019 |
| JP | 2019-041207 A | 3/2019 |
| JP | 2019-51822 A | 4/2019 |

* cited by examiner

PERIPHERY MONITORING DEVICE

CROSS REFERENCE TO RELATED APPLICATIONS

This application is based on and claims priority under 35 U.S.C. § 119 to Japanese Patent Application 2019-138054, filed on Jul. 26, 2019, the entire content of which is incorporated herein by reference.

TECHNICAL FIELD

Embodiments of this disclosure relate to a periphery monitoring device.

BACKGROUND DISCUSSION

There has been developed a technique of providing a user (e.g., a driver) with the situation of the periphery of a vehicle by generating a composite image in which a vehicle image of the vehicle is combined with a peripheral image based on a captured image obtained by imaging the periphery of the vehicle by an imaging unit, and displaying a display screen including the generated composite image on a display unit. In regard to such a technique, for example, a technique has also been proposed, in which, when an object (e.g., a pedestrian, another vehicle, or an obstacle) existing around the vehicle is detected, a frame enclosing the object is displayed to notify the user of the existence of the object. See, e.g., JP 2017-161060A (Reference 1).

However, in the technique of displaying the object by enclosing the object with the frame as described above, when the situation (e.g., position) of the object does not change, for example, when the object does not move, the frame will continue to be displayed in the same way, which makes it difficult for the user to recognize the object.

A need thus exists for a periphery monitoring device which is not susceptible to the drawback mentioned above.

SUMMARY

A periphery monitoring device according to an embodiment of this disclosure includes, for example, an acquisition unit configured to acquire a captured image from an imaging unit that captures an image of a periphery of a vehicle and positional information regarding an attention area set around the vehicle and a controller configured to superimpose and display an own vehicle image showing a position of the vehicle and an indicator indicating a position of the attention area based on the positional information on a peripheral image as a bird's-eye view image based on the captured image, and to perform display such that a display mode of the indicator changes over time.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here will be described. Configurations of the embodiments described later and actions, results, and effects provided by the configurations are given by way of example. This disclosure may be realized by configurations other than the configurations disclosed in the following embodiments, and may obtain at least one of various effects based on a basic configuration and derivative effects thereof.

(Description of Entire System)

Figure 1:
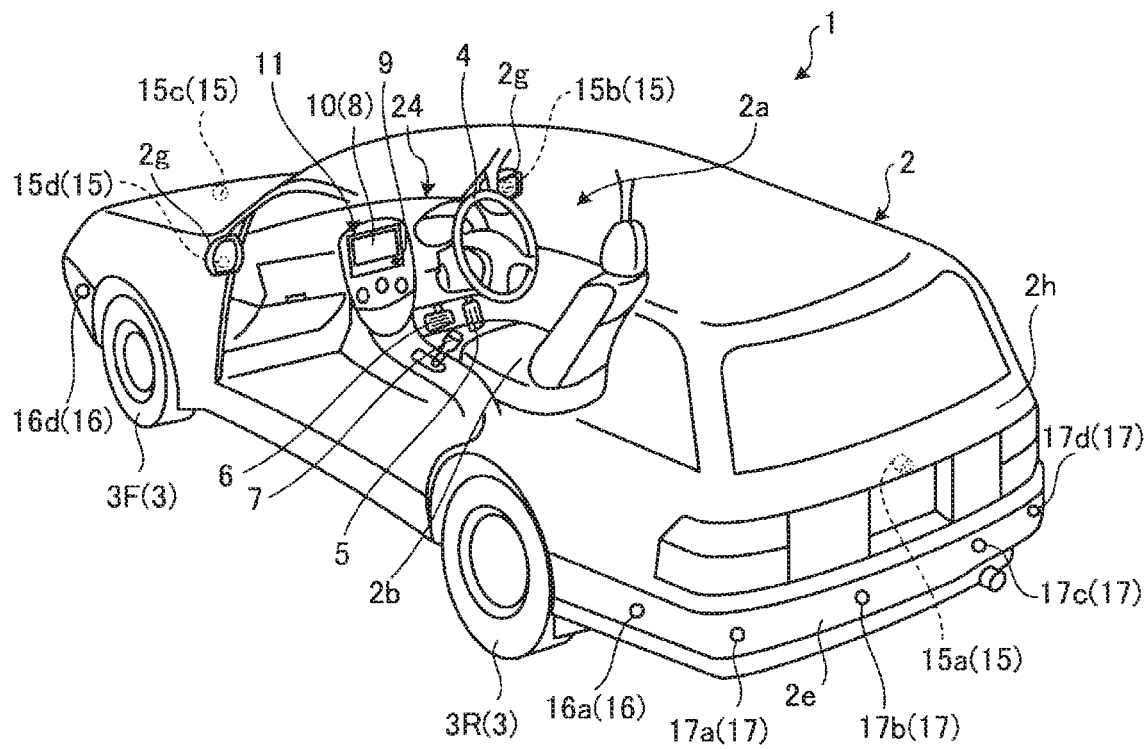
FIG. 1 is an exemplary and schematic perspective view illustrating a state where a part of a vehicle room of a vehicle equipped with a periphery monitoring device according to an embodiment is seen therethrough.

FIG. 1 is an exemplary and schematic perspective view illustrating a state where a part of a vehicle room 2a of a vehicle 1 equipped with a periphery monitoring device according to an embodiment is seen therethrough. The vehicle 1 may be an automobile (internal combustion engine automobile) having an internal combustion engine (engine) as a drive source, may be an automobile (e.g., electric automobile or fuel cell automobile) having an electric motor (motor) as a drive source, or may be an automobile (hybrid automobile) having both the internal combustion engine and the electric motor as a drive source. Further, the vehicle 1 may be equipped with any of various transmissions and various devices (e.g., systems and components) required for driving the internal combustion engine or the electric motor. The type, the number, the layout, and the like of devices associated with the driving of wheels 3 in the vehicle 1 may be set in various ways.

As illustrated in FIG. 1, a vehicle body 2 of the vehicle 1 defines the vehicle room 2a in which an occupant (not illustrated) gets. In the vehicle room 2a, a steering unit 4, an acceleration operation unit 5, a braking operation unit 6, a transmission operation unit 7, and the like are provided in a state of facing a seat 2b of a driver as the occupant. The steering unit 4 is, for example, a steering wheel protruding from a dashboard 24. The acceleration operation unit 5 is, for example, an accelerator pedal provided under the drivers foot. The braking operation unit 6 is, for example, a brake pedal provided under the drivers foot. The transmission operation unit 7 is, for example, a shift lever protruding from a center console.

Further, a display device 8 and a voice output device 9 as a voice output unit are provided in the vehicle room 2a. The display device 8 is, for example a liquid crystal display (LCD) or an organic electroluminescent display (OELD). The voice output device 9 is, for example, a speaker. Further, the display device 8 is covered with, for example, a transparent operation input unit 10 such as a touch panel. The occupant (user) may view an image displayed on a display screen of the display device 8 via the operation input unit 10. Further, the occupant may execute an operation input by operating, for example, touching, pressing, or moving the operation input unit 10 with their finger or the like at a position corresponding to the image displayed on the display screen of the display device 8. For example, the display device 8, the voice output device 9, and the operation input unit 10 are provided in a monitor device 11 located at the center of the dashboard in the vehicle width direction, i.e., in the transverse direction. The monitor device 11 may have an operation input unit (not illustrated) such as a switch, a dial, a joystick, or a push button. Further, a voice output device (not illustrated) may be provided at another position in the vehicle room 2a different from the monitor device 11, so that voice may be output from the voice output device other than the voice output device 9 of the monitor device 11. In addition, the monitor device 11 may also be used as, for example, a navigation system or an audio system.

Figure 2:
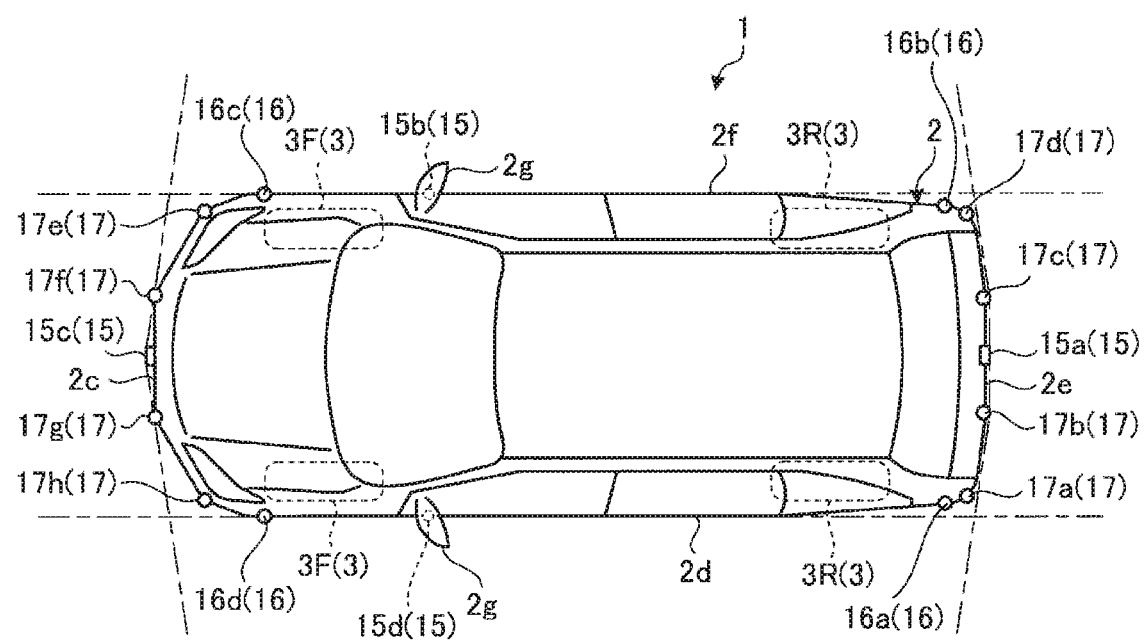
FIG. 2 is an exemplary and schematic plan view of the vehicle equipped with the periphery monitoring device according to the embodiment.

FIG. 2 is an exemplary and schematic plan view of the vehicle 1 equipped with the periphery monitoring device according to the embodiment. As illustrated in FIGS. 1 and 2, the vehicle 1 is a four-wheel automobile and includes two left and right front wheels 3F and two left and right rear wheels 3R. Some or all of the four wheels 3 are steerable.

The vehicle body 2 is provided with a plurality of imaging units 15, for example, four imaging units 15a to 15d. The imaging unit 15 is, for example, a digital camera incorporating an imaging element such as a charge coupled device (CCD) or a CMOS image sensor. The imaging unit 15 may output video image data at a predetermined frame rate. Each imaging unit 15 may have a wide-angle lens or a fish-eye lens, and may capture an image within a range from, for example, 140° to 220° in the horizontal direction. Further, the optical axis of the imaging unit 15 is set obliquely downward. Accordingly, the imaging unit 15 may sequentially capture images of the external environment of the periphery of the vehicle body 2 including the road surface on which the vehicle 1 is movable or an area in which the vehicle 1 may be parked to output captured image data.

The imaging unit 15a is located on, for example, a rear end 2e of the vehicle body 2, and is attached to a wall portion below a rear window of a rear hatch door 2h to capture an image of the situation of an area behind the vehicle 1. The imaging unit 15b is located on, for example, a right end 2f of the vehicle body 2, and is attached to a right door mirror 2g to capture an image of the situation of an area including the right front side, the right side, and the right rear side of the vehicle 1. The imaging unit 15c is located on, for example, the front side, i.e., a front end 2c of the vehicle body 2 in the vehicle longitudinal direction, and is attached to a front bumper or the like to capture an image of the situation of an area in front of the vehicle 1. The imaging unit 15d is located on, for example, the left side, i.e., on a left end 2d of the vehicle body 2 in the vehicle width direction, and is attached to a left door mirror 2g as a left protrusion to capture an image of the situation of an area including the left front side, the left side, and the left rear side of the vehicle 1. An ECU 14 (see FIG. 3) which constitutes the periphery monitoring device may execute an arithmetic processing or an image processing based on the captured image data obtained by the plurality of imaging units 15, and may generate an image with a wider viewing angle or may generate a virtual bird's eye view image of the vehicle 1 as viewed from above.

Further, the vehicle 1 includes a plurality of radars 16 as a distance measuring unit capable of measuring the distance to an object existing outside the vehicle 1. The radar 16 is, for example, a millimeter wave radar, and may measure the distance to an object existing in the traveling direction of the vehicle 1. In the present embodiment, the vehicle 1 includes a plurality of radars 16a to 16d. The radar 16a is attached to, for example, the left end of a rear bumper of the vehicle 1, and is capable of measuring the distance to an object existing on the left rear side of the vehicle 1. Further, the radar 16b is attached to the right end of the rear bumper of the vehicle 1, and is capable of measuring the distance to an object existing on the right rear side of the vehicle 1. The radar 16c is attached to the right end of the front bumper of the vehicle 1, and is capable of measuring the distance to an object existing at the right front side of the vehicle 1. Further, the radar 16d is attached to the left end of the front bumper of the vehicle 1, and is capable of measuring the distance to an object existing at the left front side of the vehicle 1.

Further, the vehicle 1 includes a sonar 17 capable of measuring the distance to an external object existing at a relatively short distance from the vehicle 1 using ultrasonic waves. In the present embodiment, the vehicle 1 includes a plurality of sonars 17a to 17h. The sonars 17a to 17d are attached to the rear bumper of the vehicle 1, and are capable of measuring the distance to an object existing behind the vehicle. The sonars 17e to 17h are attached to the front bumper of the vehicle 1, and are capable of measuring the distance to an object existing in front of the vehicle 1.

Figure 3:
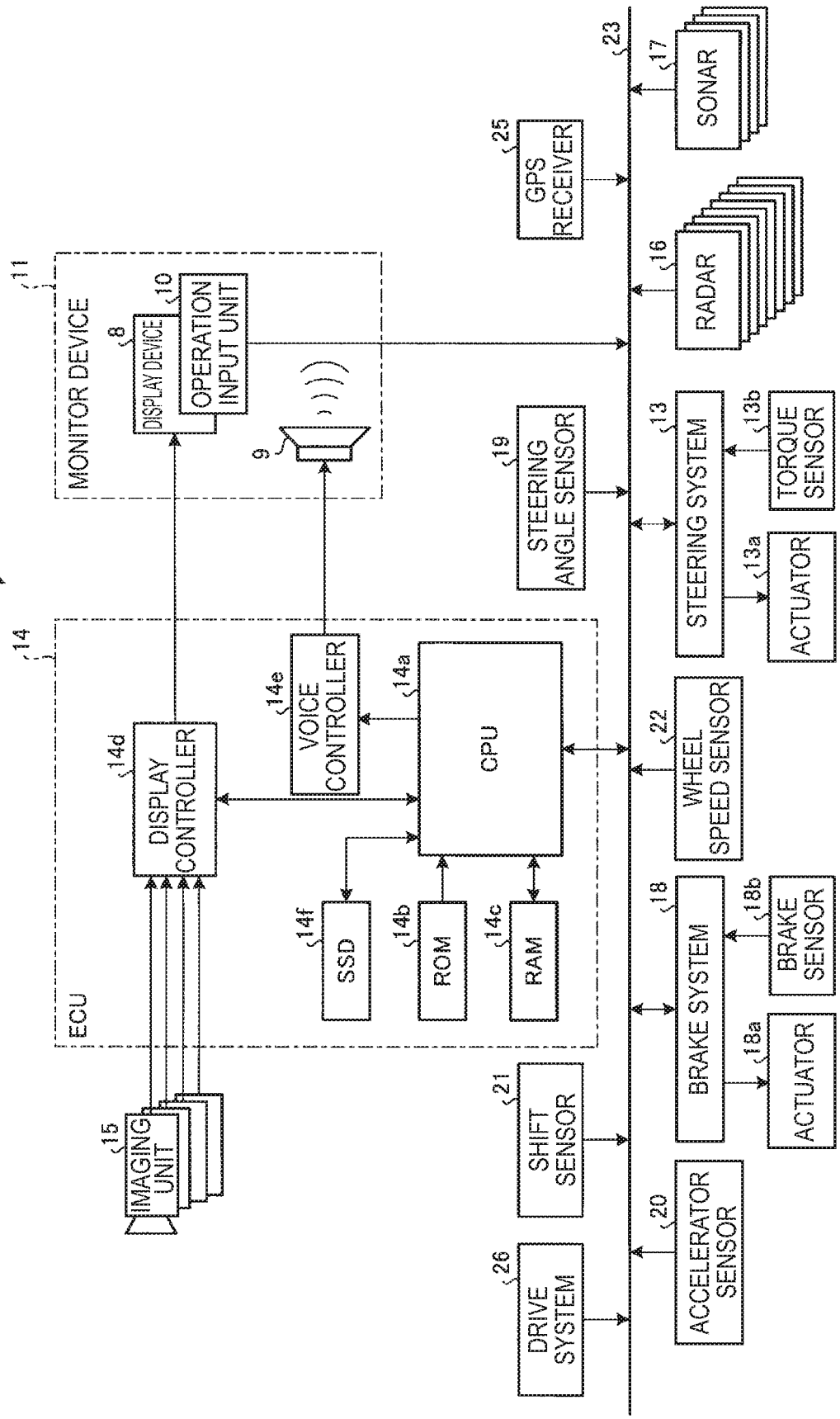
FIG. 3 is an exemplary and schematic block diagram illustrating a functional configuration of a vehicle control system including the periphery monitoring device according to the embodiment.

FIG. 3 is an exemplary and schematic block diagram illustrating a functional configuration of a control system 100 of the vehicle 1 including the periphery monitoring device according to the embodiment. As illustrated in FIG. 3, in the control system 100, in addition to the ECU 14, the monitor device 11, a steering system 13, the radars 16, the sonars 17, and the like, a brake system 18, a drive system 26, a steering angle sensor 19, an accelerator sensor 20, a shift sensor 21, a wheel speed sensor 22, a GPS receiver 25, and the like are electrically connected via an in-vehicle network 23 as an electric communication line. The in-vehicle network 23 is configured as, for example, a controller area network (CAN). The ECU 14 may control the steering system 13, the brake system 18, the drive system 26, and the like by sending control signals via the in-vehicle network 24. Further, the ECU 14 may receive the detection results of a torque sensor 13b, a brake sensor 18b, the steering angle sensor 19, the radars 16, the sonars 17, the accelerator sensor 20, the shift sensor 21, the wheel speed sensor 22, the GPS receiver 25, and the like, or an operation signal of the operation input unit 10 and the like via the in-vehicle network 23.

The steering system 13 is an electric power steering system or a steer by wire (SBW) system. The steering system 13 has an actuator 13a and the torque sensor 13b. Then, the steering system 13 is electrically controlled by the ECU 14 and the like, and steers the wheels 3 by operating the actuator 13a to apply a torque to the steering unit 4 for supplementing a steering force. The torque sensor 13b detects the torque applied to the steering unit 4 by the driver, and sends the detection result to the ECU 14.

The brake system 18 includes an anti-lock brake system (ABS) that controls the lock of a brake of the vehicle 1, an electronic stability control (ESC) system that prevents skid of the vehicle 1 at the time of cornering, an electric brake system that enhances a brake force to assist the brake, and a brake-by-wire (BBW) system. The brake system 18 has an actuator 18a and the brake sensor 18b. The brake system 18 is electrically controlled by the ECU 14 and the like, and applies a braking force to the wheels 3 via the actuator 18a. The brake system 18 detects the lock of the brake, the idling of the wheels 3, a sign of skid, and the like based on a rotation difference between the left and right wheels 3, and executes control to suppress the lock of the brake, the idling of the wheels 3, and the skid. The brake sensor 18b is a displacement sensor that detects the position of the brake pedal as a movable part of the braking operation unit 6 and sends the detection result of the position of the brake pedal to the ECU 14.

The steering angle sensor 19 is a sensor that detects the amount of steering of the steering unit 4 such as a steering wheel. The steering angle sensor 19 is configured with a Hall element and the like, and detects the rotation angle of a rotating part of the steering unit 4 as the amount of steering and sends the detection result to the ECU 14. The accelerator sensor 20 is a displacement sensor that detects the position of the accelerator pedal that is a movable part of the acceleration operation unit 5 and sends the detection result to the ECU 14.

The shift sensor 21 is a sensor that detects the position of a movable part (e.g., a bar, an arm, or a button) of the transmission operation unit 7 and sends the detection result to the ECU 14. The wheel speed sensor 22 is a sensor that has a Hall element and the like, and detects the amount of rotation of the wheel 3 or the number of rotations of the wheel 3 per unit time and sends the detection result to the ECU 14. The GPS receiver 25 acquires the current position of the vehicle 1 based on radio waves received from an artificial satellite.

The drive system 26 is an internal combustion engine (engine) system or a motor system as a drive source. The drive system 26 controls the fuel injection amount or the intake amount of the engine or the output value of the motor according to the required amount of a driver's operation (e.g., the amount of depression of the accelerator pedal) detected by the accelerator sensor 20. Further, the drive system 26 may control the output value of the engine or the motor in cooperation with the control of the steering system 13 or the brake system 18 according to the traveling state of the vehicle 1 regardless of the driver's operation.

The configurations, arrangements, and electrical connection forms of the various sensors and actuators described above are merely given by way of example, and may be set (changed) in various ways.

The ECU 14 is configured with a computer and the like, and is in charge of the overall control of the vehicle 1 by cooperation of hardware and software. Specifically, the ECU 14 has a central processing unit (CPU) 14a, a read only memory (ROM) 14b, a random access memory (RAM) 14c, a display controller 14d, a voice controller 14e, a solid state drive (SSD) 14f, a flash memory and the like.

The CPU 14a may read out a program installed and stored in a non-volatile storage device such as the ROM 14b, and may execute an arithmetic processing according to the program. For example, the CPU 14a may execute an arithmetic processing and control of an image processing related to an image displayed on the display device 8. Further, the CPU 14a may execute a distortion correction processing for correcting distortion by performing an arithmetic processing or an image processing on the captured image data on a wide-angle image (data on a curved image) obtained by the imaging unit 15, or may generate, based on the captured image data obtained by the imaging unit 15, a bird's-eye view image (peripheral image) in which an own vehicle image (own vehicle icon) showing the vehicle 1 is displayed, for example, at the center position to display the bird's-eye view image on the display device 8. Further, the CPU 14a may change the position of the virtual viewpoint when generating the bird's-eye view image to generate a bird's-eye view image that looks at the own vehicle image from directly above or a bird's-eye view image that looks at the own vehicle image from an oblique direction.

Further, the CPU 14a may execute a processing of superimposing and displaying various indicators on a display image displayed on the display device 8 to make it easy to recognize the situation around the vehicle 1, for example, an attention area existing around the vehicle (e.g., a position where a moving object or a stationary object exists). The indicator superimposed and displayed by the CPU 14a serve to make it easy to recognize the attention area that needs for the driver to pay attention such as an object detected by the radar 16 or the sonar 17 (e.g., a moving object such as a pedestrian, another vehicle, or a stationary object such as a wall or a pillar) or a target position that is automatically set by the ECU 14 or is set by the driver. When displaying the indicator, the CPU 14a may execute a processing of executing, for example, animation display in which the display mode of the indicator changes over time to make it easy for the driver to recognize the existence of the indicator, i.e., the existence of the attention area or the moving state thereof.

Further, the CPU 14a may detect (extract) a partition (e.g., a parking marking line) based on the captured image data obtained by the imaging unit 15, and may set a target area to which the vehicle 1 may move (e.g., a target position such as a parking completion position) or may acquire a guidance route for guiding the vehicle 1 to the target position. Further, the CPU 14a may execute guidance control to guide the vehicle 1 to the target area by fully automatic control (e.g., automatic control for steering, traveling, and braking), semi-automatic control (partial automatic control), or manual control (e.g., control to cause the driver to perform an operation by a voice operation guide) according to the acquired guidance route.

The ROM 14b stores various programs and parameters necessary for executing the programs. The RAM 14c temporarily stores various data used in arithmetic processings in the CPU 14a. The display controller 14d mainly executes an image processing on image data, which is acquired by the imaging unit 15 and output to the CPU 14a, and conversion from the acquired image data from the CPU 14a into display image data to be displayed on the display device 8 among the arithmetic processings in the ECU 14. The voice controller 14e mainly executes a processing on voice acquired from the CPU 14a and output to the voice output device 9 among the arithmetic processings in the ECU 14. The SSD 14f is a rewritable non-volatile storage unit, and continues to store the data acquired from the CPU 14a even when the power of the ECU 14 is turned off. The CPU 14a, the ROM 14b, the RAM 14c, and the like may be integrated in the same package. Further, the ECU 14 may be configured to use another logical operation processor such as a digital signal processor (DSP) or a logical circuit instead of the CPU 14a. Further, a hard disk drive (HDD) may be provided instead of the SSD 14f, and the SSD 14f or the HDD may be provided separately from the ECU 14.

Figure 4:
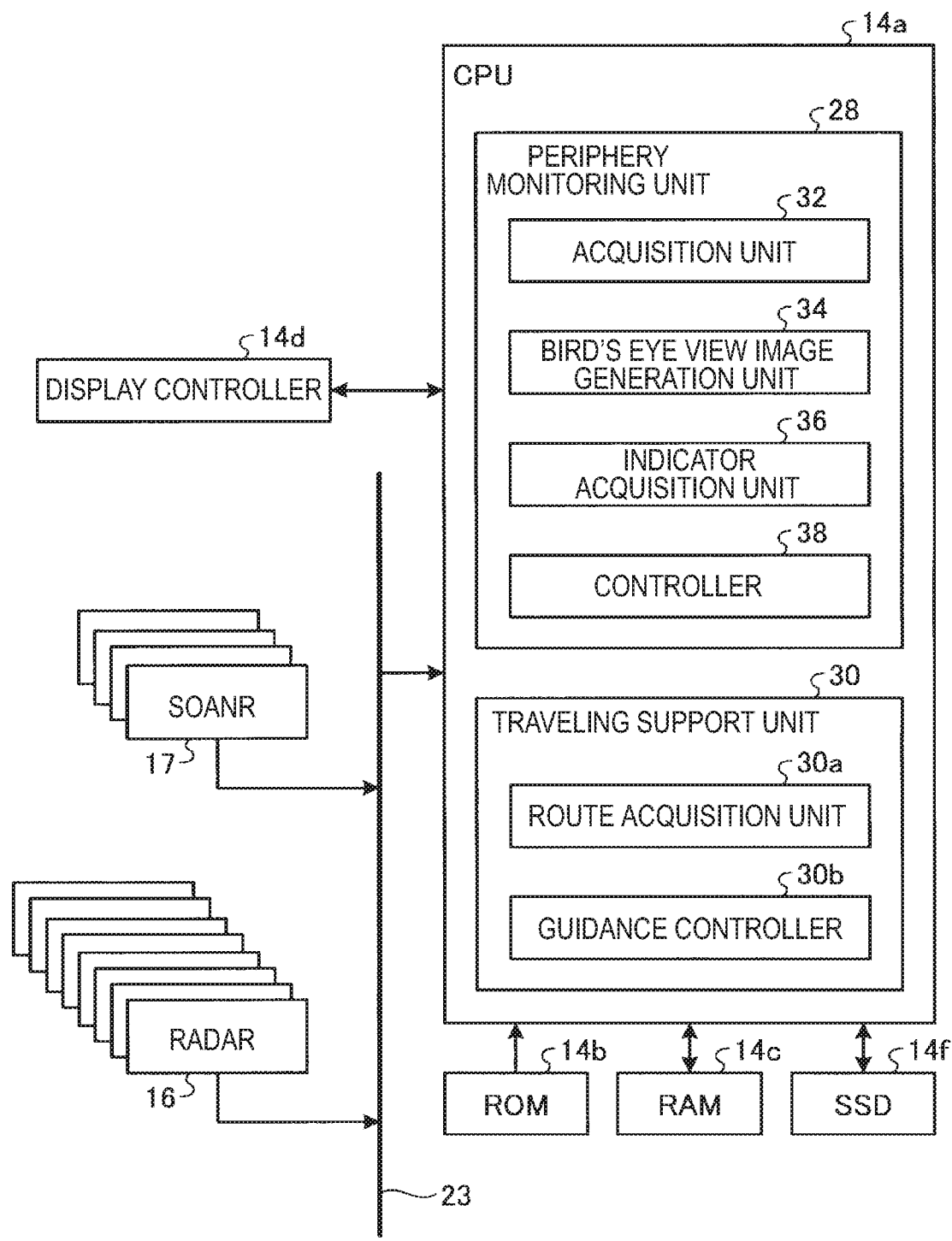
FIG. 4 is an exemplary and schematic block diagram illustrating a configuration in a case where the periphery monitoring device according to the embodiment is realized by a CPU.

FIG. 4 is an exemplary and schematic block diagram illustrating a configuration in a case where the periphery monitoring device according to the embodiment is realized by the CPU 14a. As illustrated in FIG. 4, the CPU 14a realizes a periphery monitoring unit 28 (periphery monitoring device) or a traveling support unit 30 by executing a periphery monitoring program read from the ROM 14b. Although not illustrated in FIG. 4, the CPU 14a may realize various modules necessary for traveling in addition to the periphery monitoring unit 28 or the traveling support unit 30.

The periphery monitoring unit 28 includes various modules for realizing functions thereof. The periphery monitoring unit 28 includes, for example, detailed modules such as an acquisition unit 32, a bird's-eye view image generation unit 34, an indicator acquisition unit 36, and a controller 38. Some or all of the acquisition unit 32, the bird's-eye view image generation unit 34, the indicator acquisition unit 36, the controller 38, and the like may be configured by hardware such as circuits. Further, the traveling support unit 30 includes detailed modules such as a route acquisition unit 30a and a guidance controller 30b. Some or all of the route acquisition unit 30a and the guidance controller 30b may also be configured by hardware such as circuits.

The acquisition unit 32 acquires a captured image showing information on the periphery of the vehicle 1 captured by the imaging unit 15 via the display controller 14d. Further, the acquisition unit 32 acquires positional information regarding the attention area that needs for the driver (user) to pay attention around the vehicle 1 based on the detection results of the radar 16 and the sonar 17. For example, the acquisition unit 32 acquires positional information such as the presence or absence of an object that may exist around the vehicle 1 (e.g., a moving object such as a pedestrian, another vehicle, or a stationary object such as a wall or a pillar) or the distance to the object.

The bird's-eye view image generation unit 34 executes a viewpoint conversion processing on each captured image (a rear image, a right image, a front image, or a left image) obtained by the imaging unit 15, and also executes a combining processing of joining adjacent areas to generate a bird's-eye view image. When performing the combining processing, captured images obtained by the respective imaging units 15 may have a difference in luminance (brightness) due to the attachment positions of the respective imaging units 15 (15a to 15d), the direction of imaging (photographing), the time period of photographing, whether or not a headlight is turned on, or a difference in the degree of aperture adjustment for each imaging unit 15. In this case, the bird's eye view image generated by joining may change in luminance according to original images. As a result, the difference of brightness may be conspicuous at the joining position, resulting in an unnatural image. Therefore, the bird's eye view image generation unit 42 may adjust the brightness of each image when generating the bird's-eye view image.

The indicator acquisition unit 36 determines an indicator to be superimposed and displayed on the bird's-eye view image generated by the bird's-eye view image generation unit 34 based on a position where the attention area (e.g., a moving object such as a pedestrian, another vehicle, a stationary object such as a wall or a pillar) exists in the bird's-eye view image, whether or not the attention area moves, or the state of movement (direction or contact/separation). The indicator acquisition unit 36 reads out and acquires the determined indicator from a storage unit such as the ROM 14b or the SSD 14f. The indicator acquisition unit 36 may specify the type of an object existing around the vehicle 1 by applying a technique such as deep learning to the captured image or the positional information regarding the attention area acquired by the acquisition unit 32. For example, identification of a human, an automobile, a bicycle, a wall, a pillar, and a roadside tree, and the like may be performed, so that the indicator acquisition unit 36 may acquire an indicator corresponding to an identified object. For example, when a human (e.g., pedestrian) is detected, an indicator indicating the approach of the human is acquired. Further, when a moving object such as a human, an automobile, or a bicycle is detected, an indicator indicating the moving object is acquired. Further, an indicator indicating a stationary object such as a parked vehicle, a wall, a pillar, or a roadside tree is acquired. The indicator acquisition unit 36 reads out and acquires an own vehicle image (own vehicle icon) indicating the position or posture of the vehicle 1 in the bird's-eye view image from the storage unit such as the ROM 14b or the SSD 14f. The own vehicle image is, for example, a bird's-eye view image of the vehicle 1 as viewed from above. By displaying the own vehicle image, a positional relationship between the vehicle 1 and a peripheral object may be accurately grasped. The own vehicle image may be an image in a bitmap format, or may be an image composed of a plurality of polygons showing the shape of the vehicle 1. Here, the own-vehicle image composed of a plurality of polygons may show a three-dimensional shape of the vehicle 1 represented by a plurality of polygons (e.g., triangular polygons). The image on which the indicator is superimposed and displayed is not limited to the bird's-eye view image and may be an actual image captured by the imaging unit 15.

The controller 38 superimposes and displays the own vehicle image showing the position of the vehicle 1 and the indicator indicating the position of the attention area acquired by the indicator acquisition unit 36 on the bird's-eye view image generated by the bird's-eye view image generation unit 34 or the actual image captured by the imaging unit 15. Then, when displaying the indicator, the display mode of the indicator changes over time by the controller 38.

For example, when a moving object approaching the vehicle 1 is detected based on the captured image or the positional information regarding the attention area acquired by the acquisition unit 32, the controller 38 performs display of an indicator indicating the existence of the moving object. In this case, the controller 38 superimposes and displays the indicator, for example, an arrow-shaped indicator on the bird's-eye view image or the actual image so that the position of a contour line of the indicator (arrow) moves (changes) within a predetermined display area (e.g., an area corresponding to a position 1 m ahead of the own vehicle image) over time so as to indicate the moving direction (approach direction) of the moving object. In this case, for example, a technique of animation display may be used for the scroll display of the indicator over time. By performing such animation display, it is possible to perform display that makes it easier to image the existence of the moving object (three-dimensional object) which is the attention area, the movement of the moving object, the movement direction of the moving object, and the like.

Further, the controller 38 may estimate the position of the lowermost portion (e.g., underfoot or a base) of a moving object (three-dimensional object such as a pedestrian) by applying a technique such as deep learning to the captured image acquired by the acquisition unit 32. In this case, the controller 38 superimposes and displays, for example, an indicator having a substantially circular shape or a substantially semicircular shape at a position that may be considered as the lowermost portion of the moving object. Since the lowermost portion of the moving object may be considered as being in contact with the road surface, displaying the indicator at the lowermost portion may make it easy to image the position (standing position) of the moving object (e.g., a pedestrian) on the display image or the spacing (distance) to the own vehicle image. As a result, a relative positional relationship between the attention area (three-dimensional object) and the own vehicle image (vehicle 1) may be displayed so as to be easier for the driver to recognize. Further, the controller 38 may display the indicator so that the display mode of a contour line of the substantially circular or substantially semicircular indicator indicating the lowermost portion changes over time. For example, the size of the contour line of the indicator may be enlarged or reduced over time. Further, the display color of the indicator may be changed, or the indicator may flicker. In this case, it is possible to perform display that makes it easier to recognize the lowermost portion (underfoot or a base) of the moving object (three-dimensional object).

Further, when a stationary object such as a parked vehicle, a wall, a pillar, or a roadside tree is detected around the vehicle 1 based on the captured image or the positional information regarding the attention area, which is acquired by the acquisition unit 32, the controller 38 displays an indicator indicating the existence of the stationary object in the attention area. More specifically, the controller 38 displays a virtual three-dimensional object as the indicator at a position where the stationary object exists or at a position that is at a predetermined distance ahead of that position. In this case, the controller 38 displays, as the virtual three-dimensional object (indicator), for example, a "triangular cone" that is easy for the driver to pay attention. When the triangular cone is displayed as the virtual three-dimensional object, for example, the position of the triangular cone may vertically move over time. Also in this case, the virtual three-dimensional object may be scroll-displayed over time using, for example, a technique of animation display. In this way, by displaying the indicator as the virtual three-dimensional object, it is possible to perform display that makes it easier for the driver to recognize the existence or the position of the attention area. Further, by displaying the triangular cone as the virtual three-dimensional object (indicator) indicating the existence of the stationary object in the attention area so that the position of the triangular cone moves over time, it is possible to perform display that makes it easy to recognize an unrealistic object and to distinguish (identify) a virtual object from an actual object. When changing the display mode of the virtual three-dimensional object over time, this may be performed by, for example, change of the display color or flickering display in addition to or instead of movement of the contour line.

The controller 38 may display an indicator with a stop position as the attention area when there is an area that needs to receive attention, for example, when the vehicle 1 needs to stop regardless of the presence or absence of an obstacle during traveling of the vehicle 1. For example, when parking the vehicle 1 at a predetermined position, for example, a virtual three-dimensional object (indicator) is displayed with a parking target position as the attention area. Further, in a case of parking, depending on a relationship between the current position of the vehicle 1 and a parking target position, it may be necessary to perform turning traveling, and the vehicle 1 may be necessary to move to and temporarily stop at a position different from the parking target position. Also in this case, the virtual three-dimensional object (indicator) may be displayed with a position where temporary stop is necessary as the attention area.

For example, the traveling support unit 30 realized in the CPU 14a includes the route acquisition unit 30a and the guidance controller 30b as described above. The route acquisition unit 30a may calculate parking area candidates according to the situation around the vehicle 1 based on the captured image acquired by the acquisition unit 32, and may automatically determine an optimum parking area or may cause the driver to select the optimum parking area. Further, the route acquisition unit 30a may acquire a parking area designated by an external management system or a parking area designated by the driver. Then, the route acquisition unit 30a may acquire a recommended movement route for moving the vehicle 1 from the current position of the vehicle 1 to the parking area. The route acquisition unit 30a may calculate the recommended movement route based on the current position of the vehicle 1 and a position of the parking area, or may send the current position of the vehicle 1 and the position of the parking area to an external system and acquire the calculated result. In this case, the current position of the vehicle 1 may be acquired via the GPS receiver 25, or may be acquired based on a reference position, for example, the traveling distance from the position of a gate of a parking lot or a change in the steering angle.

The guidance controller 30b guides the vehicle 1 to the parking area (parking completion position) based on the recommended movement route acquired by the route acquisition unit 30a. For example, when completely automatically guiding the vehicle 1 to the parking completion position, the guidance controller 30b controls the steering system 13, the brake system 18, the drive system 26, and the like in cooperation with each other. Further, when semi-automatically guiding the vehicle 1 to the parking completion position, the guidance controller 30b automatically controls at least one of the steering system 13, the brake system 18, and the like, and assigns control of the others to a driver's operation. The guidance controller 30b performs an operation guide by, for example, voice. Further, when manually guiding the vehicle 1 to the parking completion position, the guidance controller 30b performs, for example, a voice operation guide and assists a driver's operation.

In this case, the controller 38 displays an indicator at a position where the vehicle 1 (own vehicle image) needs to stop, i.e., in the attention area to improve the recognition degree of the driver. For example, when traveling completely automatically or semi-automatically, the controller 38 performs display of an indicator so as to make it easy for the driver to recognize that the vehicle 1 stops. Similarly, when traveling semi-automatically or manually, the controller 38 performs display of an indicator so as to make it easy for the driver to recognize the position where the vehicle 1 needs to stop. In this case, when the recommended movement route includes turning traveling, the controller 38 may perform display of an indicator by regarding not only a position where the vehicle stops at the parking completion position but also a position where the vehicle stops at the time of turning traveling as the attention area, i.e., a target position.

Furthermore, when the distance between the position of the vehicle 1 and the target position exceeds a predetermined value (predetermined distance), the controller 38 displays a target indicator (e.g., a marker) indicating an approximate target position to which the vehicle 1 needs to move. Then, when the distance between the position of the vehicle 1 (own vehicle image) and the target position becomes less than or equal to the predetermined value, the controller 38 displays, at the target position, a virtual three-dimensional object (indicator) that more accurately shows the target stop position. As a result, for example, when the vehicle is far from the target position, the vehicle 1 may be more smoothly and easily moved regardless of the accuracy of alignment. Further, the virtual three-dimensional object (indicator) that clearly shows the target position is displayed when the vehicle 1 approaches the target position, so that alignment with the target position may be performed more accurately. Further, since the virtual three-dimensional object (indicator) is displayed at the time point when the vehicle approaches the target position, it is possible to perform display that makes it easier for the user to recognize that the vehicle approaches the target position.

The controller 38 may hide the virtual three-dimensional object when the vehicle 1 (own vehicle image) reaches the target position. In this case, it is possible to perform display that makes it easy for the driver to intuitively recognize that the vehicle 1 reaches the target position.

Specific display examples of the display image by the periphery monitoring unit 28 described above will be described below.

First Embodiment

Figure 5:
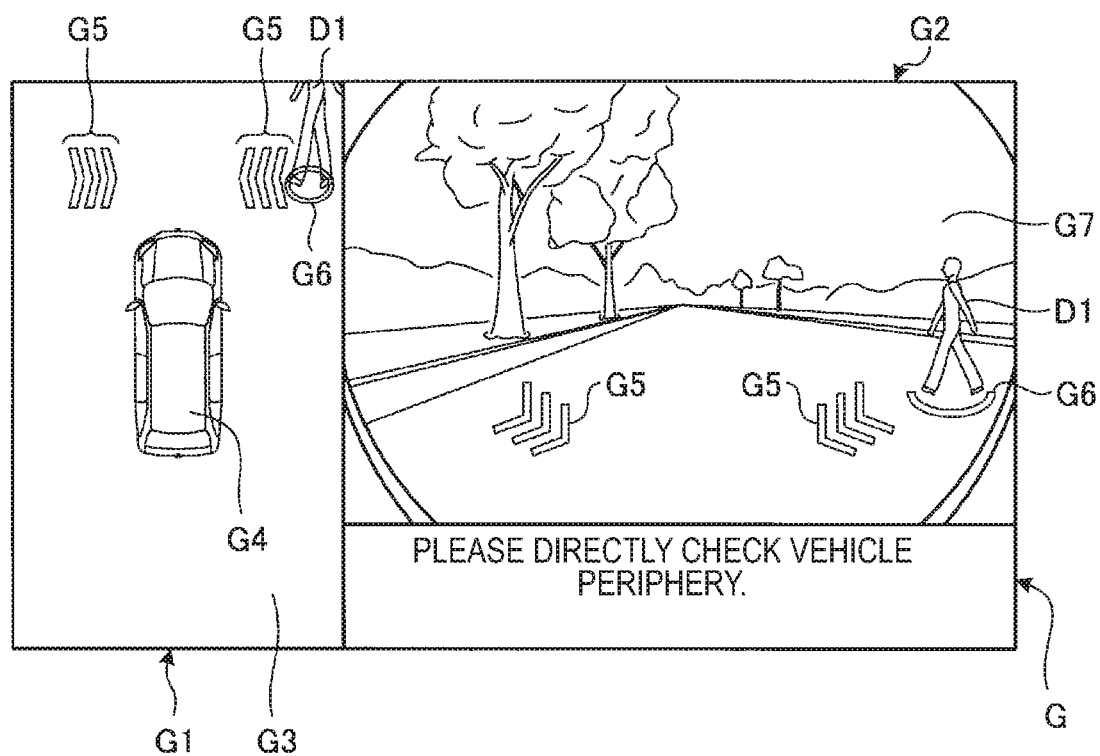
FIG. 5 is an exemplary and schematic view illustrating a display screen by a periphery monitoring device according to a first embodiment.

FIG. 5 is an exemplary and schematic view illustrating a display screen by the periphery monitoring unit 28 according to a first embodiment. FIG. 5 is an exemplary and schematic view of a display image displayed on the display device 8 in a case where the vehicle 1 is in the forward traveling state (the shift lever being in the D range) based on the detection result of the shift sensor 21 and the vehicle 1 is at a predetermined speed or lower (e.g., 12 km/h or lower) based on the detection result of the wheel speed sensor 22 or in a case where the vehicle is in a parking state (the shift lever being in the P range). Specifically, FIG. 5 illustrates, as an example of the attention area that the driver needs to pay attention, a display example of an indicator in a case where a moving object (e.g., a pedestrian D1) approaching the vehicle 1 is detected based on the captured image or the positional information acquired by the acquisition unit 32.

As illustrated in FIG. 5, a display image G displayed on the display device 8 includes a first image G1 in which the bird's-eye view image of the vehicle 1 generated by the bird's-eye view image generating unit 34 as viewed from directly above is displayed and a second image G2 in which an actual image showing, for example, the situation in front of the vehicle 1 captured by the imaging unit 15c is displayed. In FIG. 5, two screens of the first image G1 and the second image G2 are displayed side by side, but the display image G may be configured by one of them or may include three or more screens. Further, the second image G2 is displayed larger than the first image G1 in the case of FIG. 5, but the first image G1 may be displayed larger than the second image G2, and the layout of the display image G may be changed appropriately.

The first image G1 includes a peripheral image G3 and an own vehicle image G4. The peripheral image G3 is a bird's-eye view image generated by the bird's-eye view image generation unit 34 based on the captured images obtained by the imaging units 15a to 15d, and the own vehicle image G4 is a bird's-eye view image of the vehicle 1 acquired from the ROM 14b or the SSD 14f by the indicator acquisition unit 36. Further, direction indicators G5 that are an indicator indicating the approach of the moving object (e.g., the pedestrian D1) and the approach direction thereof are superimposed and displayed on the peripheral image G3 by the controller 38 at a predetermined position in front of the own vehicle image G4, for example, at a position corresponding to 1 m ahead. Furthermore, in a case where it may be considered that there exists a moving three-dimensional object (e.g., the pedestrian D1) in the display area of the peripheral image G3, an underfoot indicator G6 as the indicator is superimposed and displayed by the controller 38 on a portion that may be considered as the lowermost portion (underfoot) of the three-dimensional object.

As described above, an actual image showing the situation in front of the vehicle 1 captured by the imaging unit 15c is displayed as a peripheral image G7 in the second image G2. The direction indicators G5 are also superimposed and displayed on the peripheral image G7 similarly to the first image G1. Since the peripheral image G7 is an actual image captured by the imaging unit 15c via a fish-eye lens and therefore, is a curved image, the display posture of the direction indicators G5 is also curved. However, as illustrated in the first image G1, the direction indicators G5 are arranged at a predetermined interval therebetween in the vehicle width direction at a predetermined position in front of the own vehicle image G4, for example, at a position corresponding to 1 m ahead. That is, the direction indicators G5 of the first image G1 and the direction indicators G5 of the peripheral image G7 are displayed at corresponding positions.

The direction indicators G5 are displayed at predetermined positions of the peripheral image G3 and the peripheral image G7 in a case where the vehicle speed of the vehicle 1 detected by the wheel speed sensor 22 is low (e.g., 12 km/h or lower) and the radar 16 and the sonar 17 are operating. As described above, when the detection result of the shift sensor 21 is, for example, "D range" (driving) or "P range" (parking), the direction indicators G5 are displayed at a front position corresponding to, for example, 1 m ahead of the vehicle 1. Further, when the detection result of the shift sensor 21 is, for example, "R range" (reverse), the direction indicators G5 are displayed at a rear position corresponding to, for example, 1 m behind the vehicle 1. In the case of FIG. 5, the direction indicators G5 are formed in an arrow shape that points at the own vehicle image G4 (vehicle 1) so as to indicate the approach of the moving object. Therefore, the direction indicator G5 on the right side of the own vehicle image G4 (vehicle 1) is a leftward arrow so as to indicate that the approach of the moving object to the own vehicle image G4 (vehicle 1) from the right side. Similarly, the direction indicator G5 on the left side of the own vehicle image G4 (vehicle 1) is a rightward arrow so as to indicate the approach of the moving object to the own vehicle image G4 (vehicle 1) from the left side. When no approaching moving object is detected by the radar 16 or the sonar 17, the controller 38 displays the direction indicators G5, for example, in a stationary display mode in a high transparency state (translucent state) to indicate that the detection of the moving object is possible.

Figure 6:
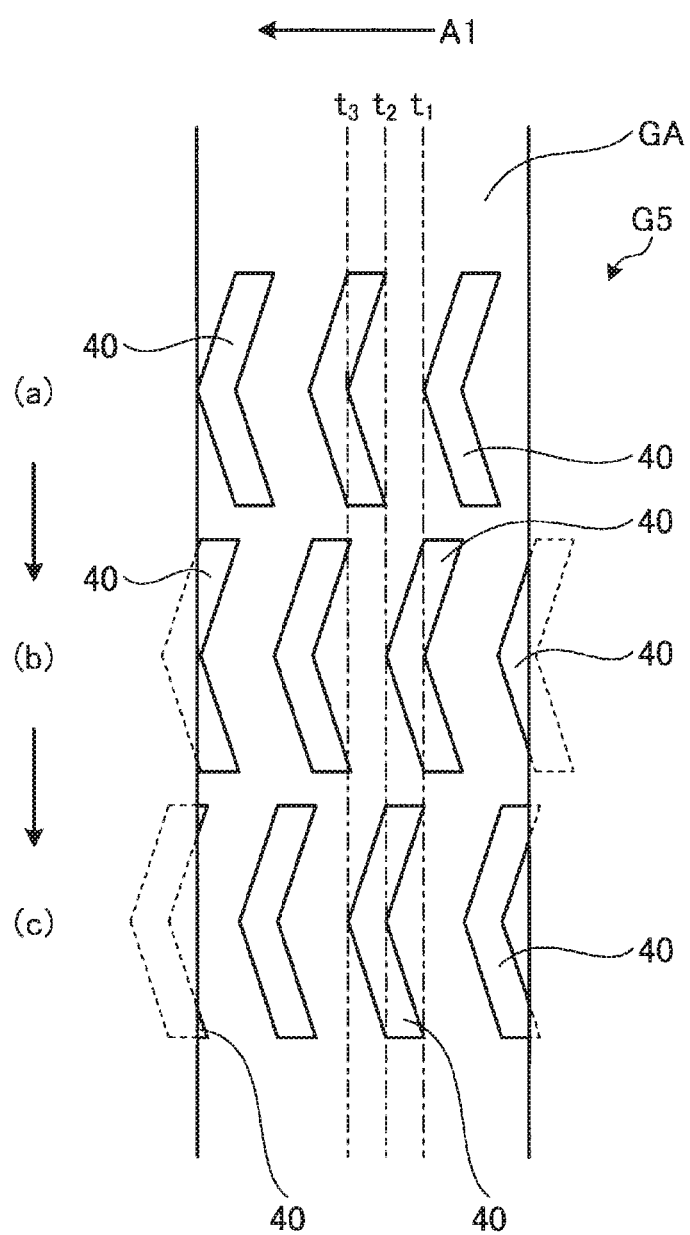
FIG. 6 is an exemplary and schematic view illustrating a display mode of an indicator displayed by the periphery monitoring device according to the first embodiment in which the position of a contour line moves (changes) over time.

Meanwhile, as illustrated in FIG. 5, for example, when the moving object (pedestrian D1) approaches from the right side of the own vehicle image G4 (vehicle 1), the controller 38 lowers the transparency of the right direction indicator G5 and changes the display mode thereof into, for example, yellow and then, executes, for example, animation display so that the entire direction indicator G5 moves over time within a predetermined display area (range). FIG. 6 is an exemplary and schematic view illustrating an example of animation display of the direction indicator G5. In FIG. 6, for example, arrow-shaped individual indicators 40 (contour lines) that constitute the direction indicator G5 move in an approach direction A1 of the moving object in the order of a display mode (a), a display mode (b), and a display mode (c). The display mode (a) is a display mode when the moving body (e.g., the pedestrian D1) is not detected, and is displayed as stationary in a high transparency state. The case of FIG. 6 is an example in which three individual indicators 40 are equidistantly displayed in a display area GA of the direction indicator G5 so that arrowheads thereof point at the moving direction (e.g., the left side in the vehicle width direction) so as to indicate the moving direction (approach direction A1: the direction from the upstream (right) side to downstream (left) side) of the moving object (e.g., the pedestrian D1).

Next, when the moving object (e.g., the pedestrian D1) is detected by the radar 16 or the sonar 17, the controller 38 lowers the transparency of each individual indicator 40 and changes the display mode thereof to an emphasis color such as yellow. Then, the controller 38 moves and displays the individual indicator 40 displayed at the rearmost side at time t1 as illustrated in the display mode (a) in the approach direction A1 at time t2 as illustrated in the display mode (b). Subsequently, as illustrated in the display mode (c), at time t3, the controller 38 again moves and displays the individual indicator 49 at time t3 in the approach direction A1. The controller 38 similarly moves contour lines of the other individual indicators 40 which are equidistantly arranged in the approach direction A1. That is, in the display mode (b), a new individual indicator 40 starts to be gradually displayed toward a position where the upstream (rearmost) side individual indicator 40 was present in the display mode (a). Meanwhile, the individual indicator 40 displayed at the downstream (foremost) side disappears in such a manner that a portion thereof corresponding to the individual indicator 40 which starts to be displayed at the upstream side is pushed out from the display area GA. In the display mode (c), the above-described state further progresses, so that most of the new individual indicator 40 at the upstream side appears and conversely, most of the individual indicator 40 at the downstream side disappears. Therefore, although there may exist the individual indicator 40 divided into two parts, three individual indicators 40 are always displayed in the display area GA. Then, the controller 38 may execute animation display so that three individual indicators 40 (direction indicator G5) are always scrolled by performing continuous display in the order of the display modes (a), (b), and (c). The controller 38 executes animation display of the direction indicator G5 when the moving object is detected within a predetermined range centered on the radar 16 or the sonar 17. In this case, even if the moving object is stationary, the controller 38 continues to perform animation display when the moving object exists within the predetermined range. As a result, it is possible to perform display that makes it easy for the driver to recognize the existence and the approach direction of the moving object regardless of whether or not the moving object moves.

Figure 7:
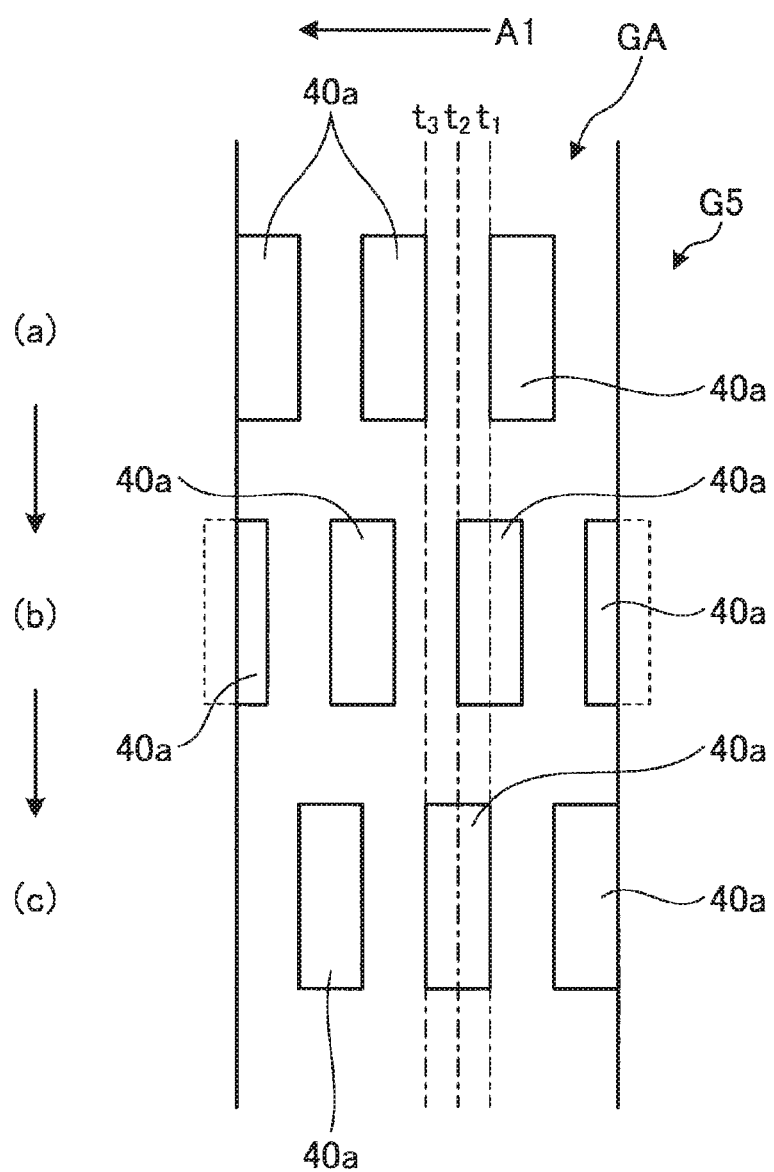
FIG. 7 is another exemplary and schematic view illustrating the display mode of the indicator displayed by the periphery monitoring device according to the first embodiment in which the position of the contour line moves (changes) over time.
Figure 8:
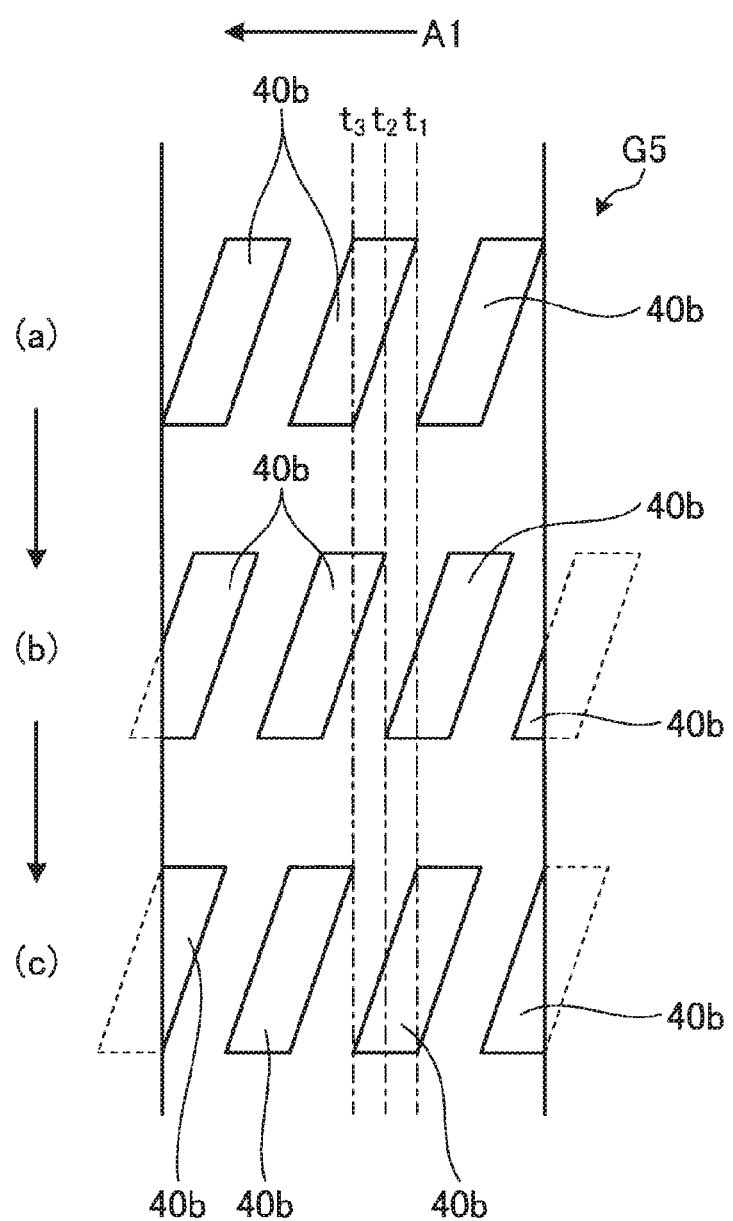
FIG. 8 is still another exemplary and schematic view illustrating the display mode of the indicator displayed by the periphery monitoring device according to the first embodiment in which the position of the contour line moves (changes) over time.
Figure 9:
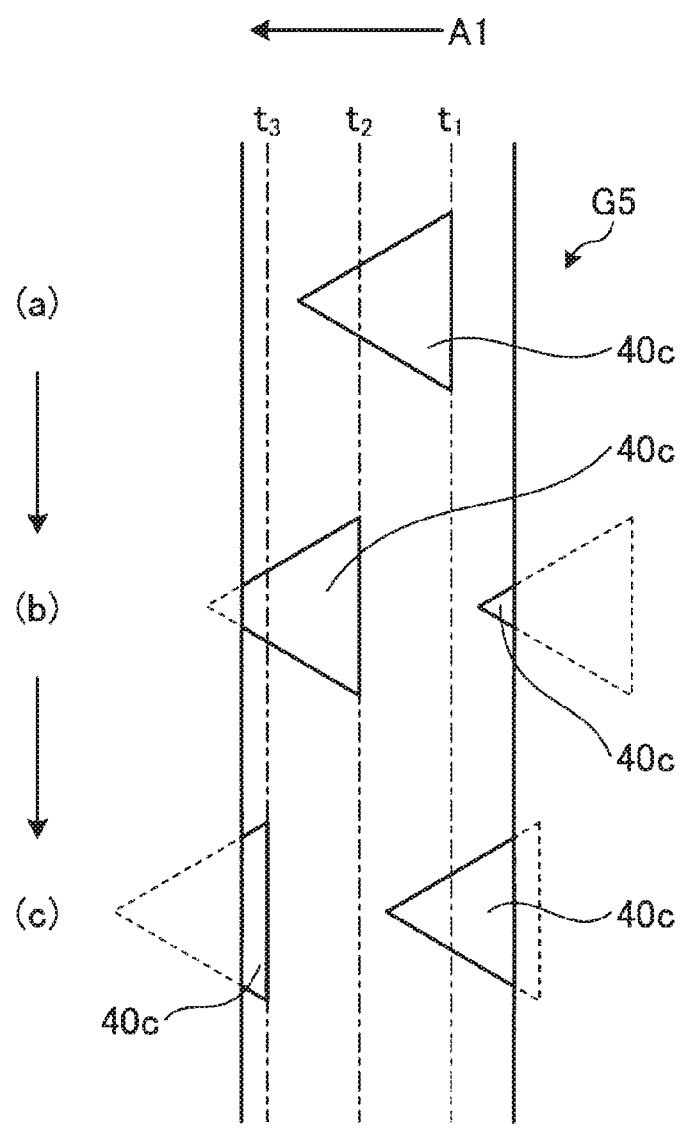
FIG. 9 is a further exemplary and schematic view illustrating the display mode of the indicator displayed by the periphery monitoring device according to the first embodiment in which the position of the contour line moves (changes) over time.

The shape or the number of individual indicators 40 constituting the direction indicator G5 may be changed appropriately as long as the individual indicators 40 indicate the moving direction of the moving object. FIGS. 7 to 9 are exemplary and schematic views illustrating other shapes of the individual indicators 40 constituting the direction indicator G5.

FIG. 7 is an example in which three rectangular individual indicators 40a are displayed in the display area GA of the direction indicator G5, as in the example of FIG. 6. Also in the case of FIG. 7, when the individual indicator 40a displayed at the rearmost side at time t1 in the display mode (a) moves in the approach direction A1 at time t2 as illustrated in the display mode (b), a new individual indicator 40a starts to appear at the upstream side. On the other hand, the individual indicator 40a displayed at the foremost side at time t1 in the display mode (a) starts to disappear at the downstream side as illustrated in the display mode (b). In the display mode (c), the above-described state further progresses, so that the new individual indicator 40a completely appears at the upstream side and conversely, the individual indicator 40a at the downstream side completely disappears. Therefore, although there may exist the individual indicator 40a divided into two parts, three individual indicators 40a are always displayed in the display area GA. As a result, as in FIG. 6, it is possible to perform display that makes it easy for the driver to recognize the existence and the approach direction of the moving object.

FIG. 8 is an example in which three tilted rectangular individual indicators 40b are displayed in the display area GA of the direction indicator G5. Also in the case of FIG. 8, when the individual indicator 40b displayed at the rearmost side at time t1 in the display mode (a) moves in the approach direction A1 at time t2 as illustrated in the display mode (b), a new individual indicator 40b starts to appear at the upstream side. Meanwhile, the individual indicator 40b displayed at the foremost side at time t1 in the display mode (a) starts to disappear at the downstream side as illustrated in the display mode (b). In the display mode (c), the above-described state further progresses, so that about half of the new individual indicator 40b appears at the upstream side and conversely, about half of the individual indicator 40b at the downstream side disappears. Therefore, although there may exist the individual indicator 40b divided into two parts, three individual indicators 40b are always displayed in the display area GA. As a result, as in the cases of FIGS. 6 and 7, it is possible to perform display that makes it easy for the driver to recognize the existence and approach direction of the moving object. As illustrated in FIG. 7, by sequential animation display of the individual indicators 40b having a tilted shape, it is possible to perform display that makes it easier to image the moving direction than in the case of FIG. 7.

FIG. 9 illustrates an example in which one triangular individual indicator 40c is displayed in the display area GA of the direction indicator G5. In the case of FIG. 9, the entire individual indicator 40c is displayed at time t1 in the display mode (a). When the individual indicator 40c moves in the approach direction A1, as illustrated in the display mode (b), a portion of the individual indicator 40c starts to disappear at the downstream side at time t2. Meanwhile, the foremost portion of the individual indicator 40c corresponding to the portion disappeared at the downstream side in the display mode (b) starts to be displayed at the upstream side. In the display mode (c), the above-described state further progresses. Therefore, although there may exist the individual indicator 40c divided into two parts, one individual indicator 40c is always displayed in the display area GA. As a result, as in the cases of FIGS. 6 to 8, it is possible to perform display that makes it easy for the driver to recognize the existence and approach direction of the moving object. As illustrated in FIG. 9, by animation display of scrolling one individual indicator 40c larger than the individual indicators of the other examples, it is possible to enable fast and slow easy-to-gaze display and to perform display that makes it easy to image the existence or the moving direction of the moving object.

As illustrated in FIGS. 6 to 9, when the individual indicators 40, 40a, 40b, and 40c are scroll-displayed over time, by executing an interpolation processing between the display modes (a), (b), and (c), it is possible to realize display of individual indicators that appear to move more smoothly.

When the moving object moves away from the own vehicle image G4 (vehicle 1), the direction indicator G5 returns to a stationary state with high transparency. As a result, it makes it possible for the driver to recognize that the moving object (pedestrian D1) moves away from the vehicle 1 and the risk of contact is reduced. Further, FIG. 5 illustrates an example in which the direction indicators G5 are arranged at the left and right sides in the vehicle width direction so as to make it easy to recognize the presence or absence of the moving object or the approach direction of the moving object when the moving object approaches from the lateral side of the own vehicle image G4 (vehicle 1). In another embodiment, when the moving object approaches from the front side of the own vehicle image G4 (vehicle 1), the direction indicators G5 may be arranged in the vehicle longitudinal direction so as to make it easy to recognize the presence or absence of the moving object or the approach direction of the moving object. Further, the direction indicators G5 may be arranged in a combination of the vehicle width direction, the vehicle longitudinal direction, and any other direction. Further, the display position of the direction indicator G5 may change according to the approach direction of the detected moving object.

In this way, by performing display in which the display mode of the contour line of the direction indicator G5 changes (moves) over time, for example, it is more clearly expressed that the direction indicator G5 is moving compared to a case where the indicator simply flickers or the display color thereof is changed. Further, by performing display in which the display mode of the contour line of the direction indicator G5 changes (moves) over time, it is possible to perform display so as to make it easier for the driver to recognize the existence or the moving direction (approach direction) of the moving object (attention area) regardless of whether or not the moving object moves.

Figure 10:
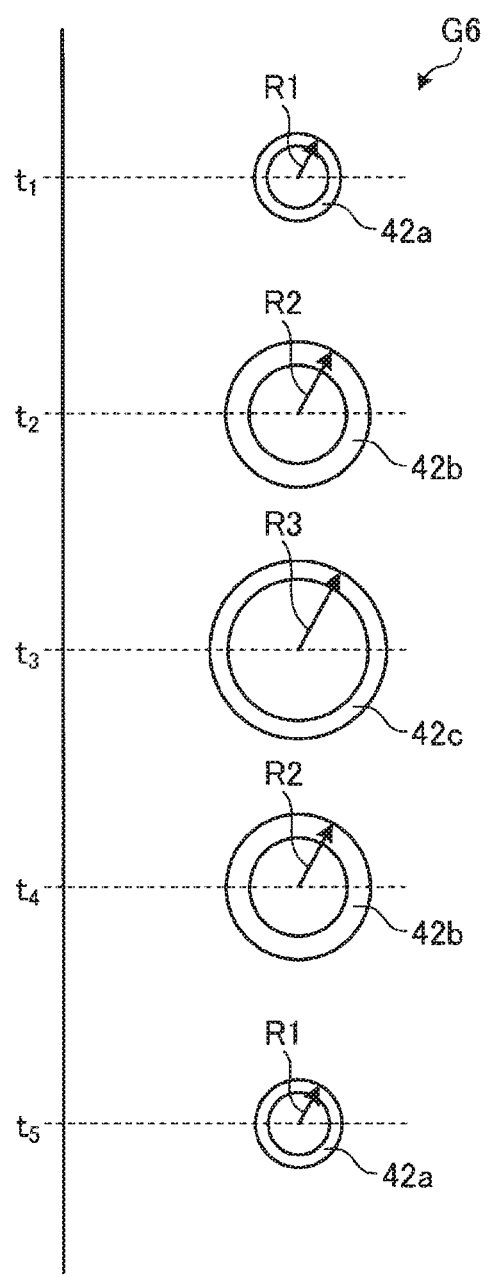
FIG. 10 is an exemplary and schematic view illustrating a display mode of another indicator displayed by the periphery monitoring device according to the first embodiment in which the radius of a contour line changes over time.

Further, when it may be considered that there is the three-dimensional object (e.g., the pedestrian D1) that is moving into the display area of the peripheral image G3 (peripheral image G7), the underfoot indicator G6 displayed in a portion that may be considered as the lowermost portion (underfoot) of the three-dimensional object may be displayed, for example, as a red indicator having a substantially circular shape or a substantially semicircular shape. The underfoot indicator G6 is displayed on the lowermost portion of the moving object (underfoot of the pedestrian D1) so as to follow the movement of the moving object (the pedestrian D1). Further, similarly to the direction indicator G5, the display mode of the contour line of the underfoot indicator G6 changes over time. Specifically, the radius of the underfoot indicator G6 having a substantially circular shape is displayed as enlarged or reduced. For example, in FIG. 10, the underfoot indicator G6 is a small-diameter indicator 42a with a radius R1 at time t1, and the contour line thereof changes so as to be enlarged to a medium-diameter indicator 42b with a radius R2 at time t2. Subsequently, the underfoot indicator G6 becomes a large diameter indicator 42c with a maximum radius R3 at time t3, and the contour line thereof changes so as to be reduced to the medium diameter indicator 42b with the radius R2 at time t4 and returns to the small diameter indicator 42a with the original radius R1 at time t5. When the three-dimensional object (moving object such as the pedestrian D1) is detected in the display area of the peripheral image G3, the underfoot indicator G6 is displayed on the lowermost portion (underfoot) of the object regardless of whether or not the object moves, continuing to be displayed as enlarged or reduced over time. As a result, it is possible to perform display that makes it easier for the driver to recognize the existence of the three-dimensional object (attention area) regardless of whether or not the three-dimensional object (moving object such as the pedestrian D1) moves. Further, by displaying the underfoot indicator G6 under the feet of the three-dimensional object (moving object such as the pedestrian D1), it is possible to perform display that makes it easy for the driver to recognize the contact position (standing position) between the three-dimensional object (moving object such as the pedestrian D1) and the road surface and to recognize a relative positional relationship between the three-dimensional object (attention area) and the own vehicle image G4 (vehicle 1).

In the first image G1 which is a bird's-eye view image, the underfoot indicator G6 is displayed, for example, in a substantially circular shape, but, in the second image G2 which displays the actual image, the underfoot indicator G6 may be displayed, for example, in a substantially semicircular shape on the lowermost portion of the three-dimensional object (moving object such as the pedestrian D1) to improve visibility. In this case, the radius of the substantially semicircular underfoot indicator G6 displayed in the second image G2 may be enlarged or reduced, similarly to the underfoot indicator G6 displayed in the first image G1. Further, since the first image G1 is converted into the bird's-eye view image, the three-dimensional object (e.g., the pedestrian D1) may be displayed as stretched, and may be deteriorated in coincident recognition with the moving object (e.g., the pedestrian D1) displayed as an actual image in the second image G2. Therefore, when the underfoot indicators G6 are displayed respectively in the first image G1 and the second image G2, the underfoot indicators G6 may be displayed in the same display color (e.g., red) to make it easy to recognize that they correspond to each other. Further, when there exist a plurality of three-dimensional objects (moving objects such as pedestrians D1) around the vehicle 1, the three-dimensional objects may be displayed in the same display color from the viewpoint that they indicate three-dimensional objects that need to receive attention without identifying the respective three-dimensional objects. In another embodiment, for example, an individual ID may be attached to each three-dimensional object to identify the three-dimensional object, and for example, the display color may be different for each three-dimensional object. The shape of the underfoot indicator G6 is an example, and may be changed appropriately to obtain the same effects as long as it may indicate the lowermost portion (underfoot) of the three-dimensional object.

As described above, according to the first embodiment, the periphery monitoring unit 28 changes the display modes of the direction indicator G5 and the underfoot indicator G6 over time regardless of whether or not the attention area (moving object or three-dimensional object) moves, so that it is possible to perform display that makes it easier for the user to recognize the existence, position, or moving direction of the attention area (moving object or three-dimensional object).

Second Embodiment

Figure 11:
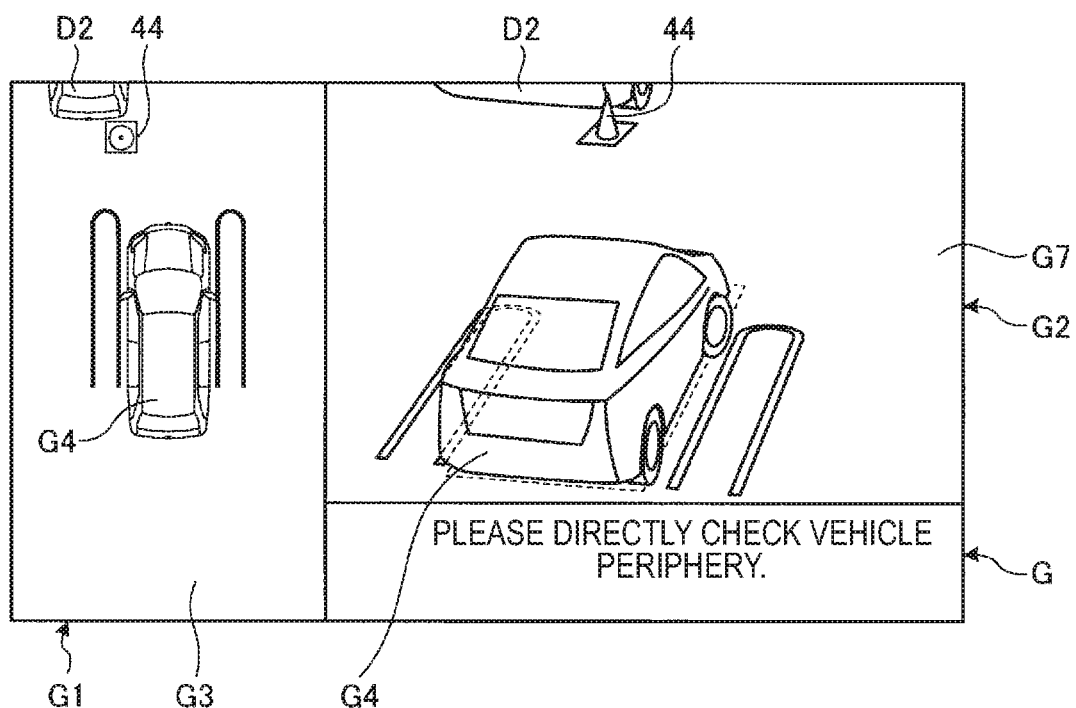
FIG. 11 is an exemplary and schematic view illustrating a display screen by a periphery monitoring device according to a second embodiment.

FIG. 11 is an exemplary and schematic view illustrating a display screen by the periphery monitoring unit 28 according to a second embodiment. FIG. 11 is an exemplary and schematic view of a display image displayed on the display device 8 in a case where the vehicle 1 is in the forward traveling state (the shift lever being in the D range) based on the detection result of the shift sensor 21 and the vehicle 1 is at a predetermined speed or lower (e.g., 12 km/h or lower) based on the detection result of the wheel speed sensor 22 or in a case where the vehicle is in a parking state (the shift lever being in the P range). Specifically, FIG. 11 illustrates, as an example of the attention area that the driver needs to pay attention, a display example of an indicator in a case where a stationary object (e.g., another vehicle D2) in front of the vehicle 1 is detected based on the captured image or the positional information acquired by the acquisition unit 32.

As illustrated in FIG. 11, the display image G displayed on the display device 8 includes the first image G1 in which the bird's-eye view image of the vehicle 1 generated by the bird's-eye view image generating unit 34 as viewed from directly above is displayed as the peripheral image G3 and the second image G2 in which a bird's-eye view image of the vehicle 1 as viewed obliquely from the upper rear side which is enlarged from the first image G1 is displayed as the peripheral image G7. In FIG. 11, two screens of the first image G1 and the second image G2 are displayed side by side, but the display image G may be configured by one of them or may include three or more screens. Further, the second image G2 is displayed larger than the first image G1 in the case of FIG. 11, but the first image G1 may be displayed larger than the second image G2, and the layout of the display image G may be changed appropriately.

The first image G1 includes the peripheral image G3 and the own vehicle image G4, as in FIG. 5 illustrating the first embodiment. Further, when the stationary object (e.g., the other vehicle D2) is detected in a predetermined area around the radar 16 or the sonar 17 in an area in front of the vehicle 1, a virtual three-dimensional object 44 (e.g., a triangular cone) as an example of an indicator displayed in a case where it is considered that there is an area (attention area) that the driver needs to pay attention is superimposed and displayed by the controller 38. Further, the virtual three-dimensional object 44 is also superimposed and displayed by the controller 38 at a position corresponding to the other vehicle D2 in the peripheral image G7 of the second image G2.

Figure 12:
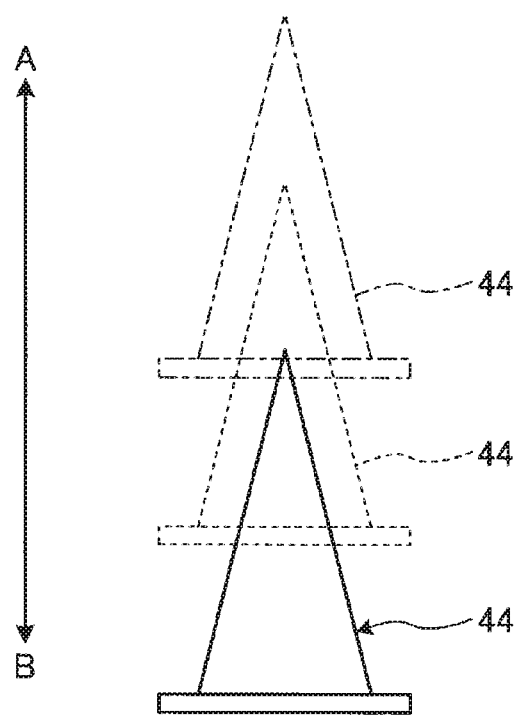
FIG. 12 is an exemplary and schematic view illustrating a display mode of an indicator displayed by the periphery monitoring device according to the second embodiment in which the position of a contour line moves (changes) over time.

The triangular cone as the virtual three-dimensional object 44 is effective as an indicator for allowing the driver to recognize the attention area because the triangular cone has a shape that easily alerts the driver even in a normal driving environment, but other three-dimensional objects such as a pole, a flag, or any other guidance member may be used. The display mode of a contour line of the virtual three-dimensional object 44 as the indicator changes (moves) over time so as to make it easy for the driver to recognize that the virtual three-dimensional object 44 is an unrealistic object. For example, as illustrated in FIG. 12, the virtual three-dimensional object 44 may move in the direction of arrow AB over time. The display position (height) H of the virtual three-dimensional object 44 (triangular cone) may be changed by, for example, the following equations:

$$H = \text{Reference Height} \times (1.0 - \sin \theta)$$

$$\theta = 2\pi \times (\text{Passed Time ms/Cycle ms})$$

In this way, by changing the display position (height) H of the virtual three-dimensional object 44 (triangular cone) using a trigonometric function, no inflection point exists at the upper end or the lower end of movement, so that smooth vertical movement of the virtual three-dimensional object 44 may be realized. In another embodiment, the vertical movement of the virtual three-dimensional object 44 may be realized by using a waveform having an inflection point such as saw tooth waves. In this case, characteristics peculiar to a moving operation appears, and it is possible to perform display that makes it easy for the driver to recognize.

As described above, according to the second embodiment, since the periphery monitoring unit 28 changes the display mode of the virtual three-dimensional object 44 which is the indicator over time even when the attention area is the stationary object, it is possible to perform display that makes it easier for the user to recognize the existence and position of the attention area (stationary object). When displaying the virtual three-dimensional object 44, the controller 38 may change the display color of the virtual three-dimensional object 44 over time, or the virtual three-dimensional object 44 may be displayed to flicker overtime, in addition to or instead of the movement of the contour line over time. The display color of the virtual three-dimensional object 44 may be changed over time into, for example, red or black, or the virtual three-dimensional object 44 may flicker in, for example, red and black over time.

Third Embodiment

Figure 13:
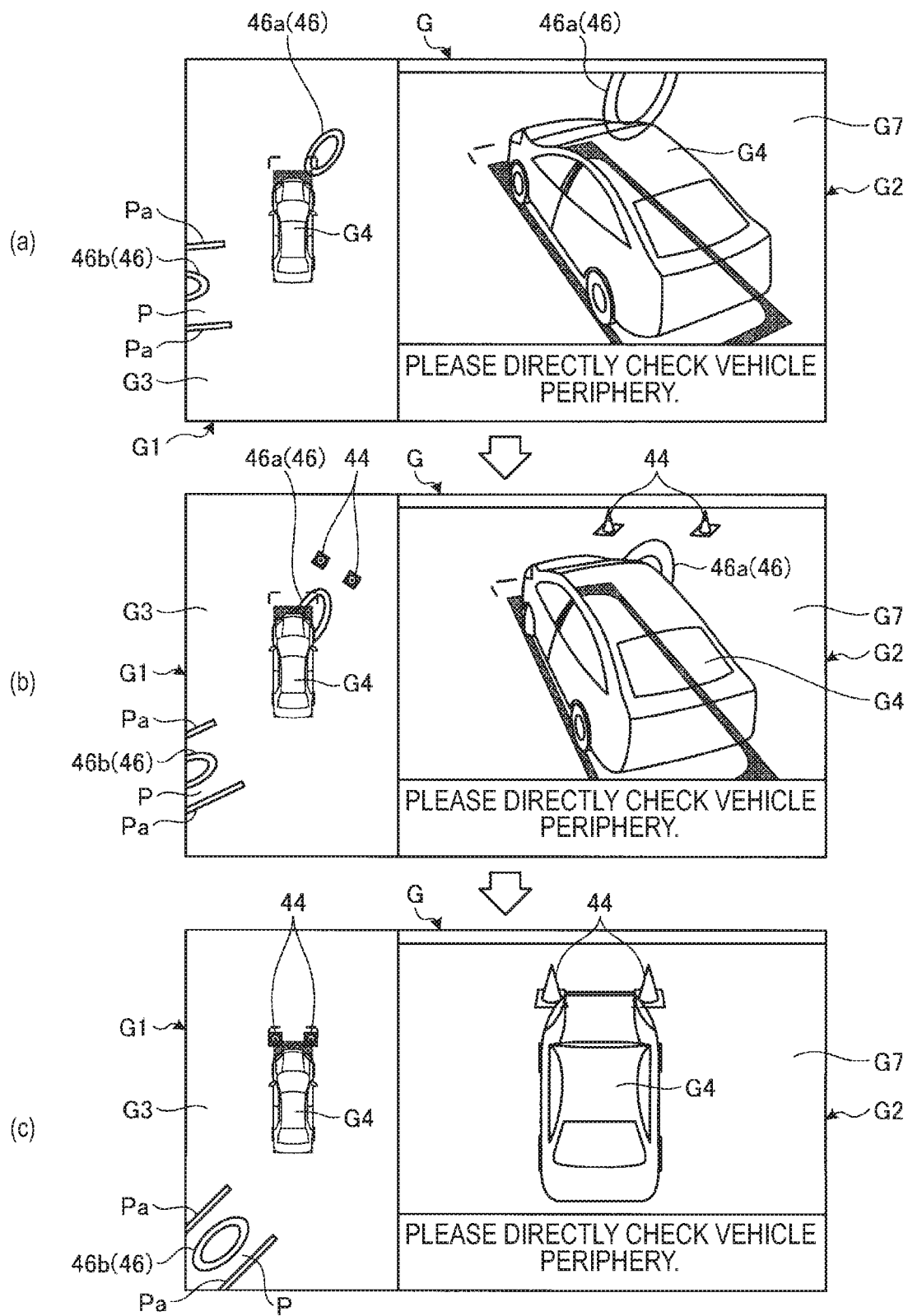
FIG. 13 is an exemplary and schematic view illustrating an example of a display screen by a periphery monitoring device according to a third embodiment, the display screen being displayed when traveling forward to a turning position for parking.
Figure 14:
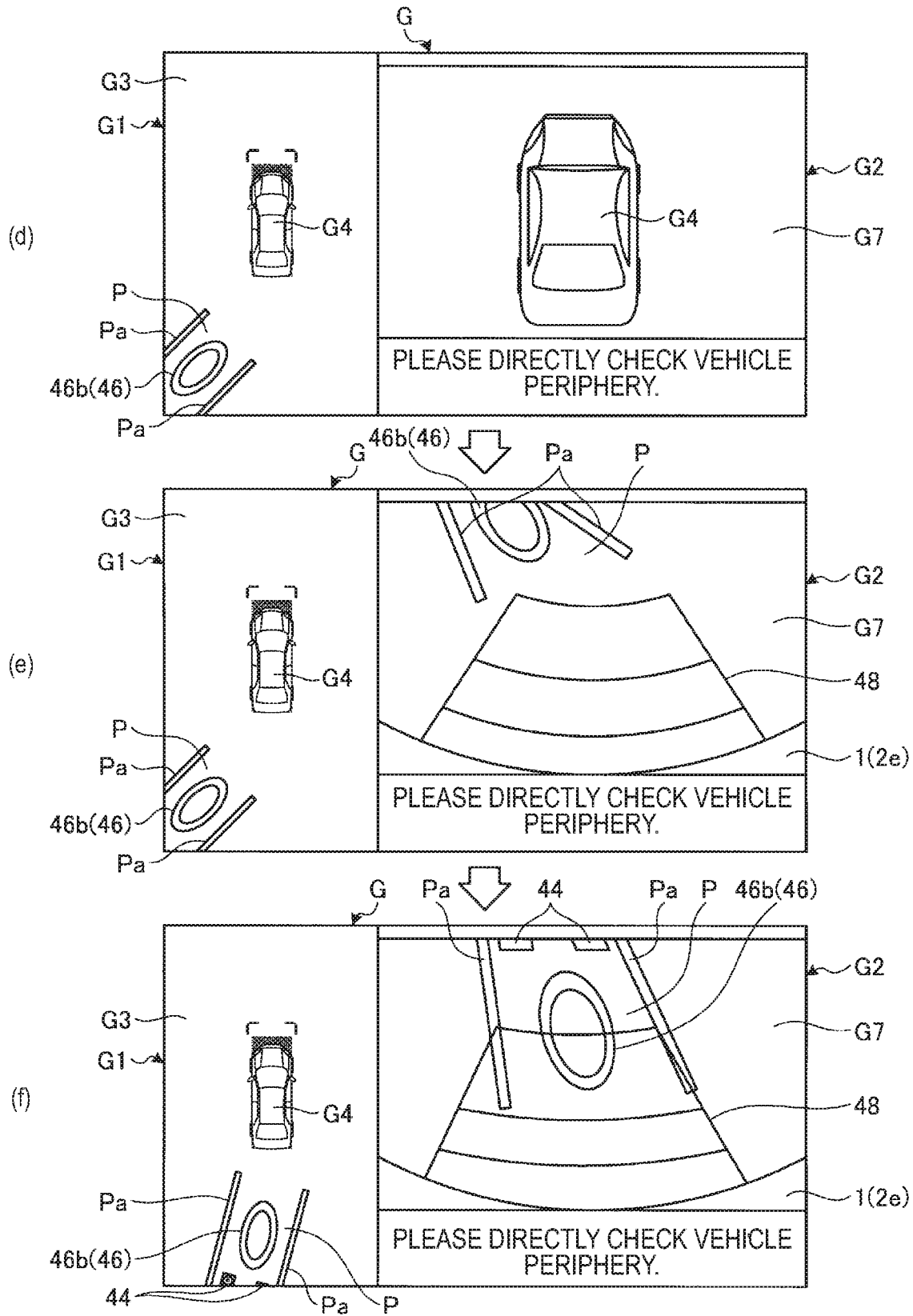
FIG. 14 is an exemplary and schematic view illustrating an example of a display screen by the periphery monitoring device according to the third embodiment, the display screen being displayed when traveling reverse to a parking position, following FIG. 13.
Figure 15:
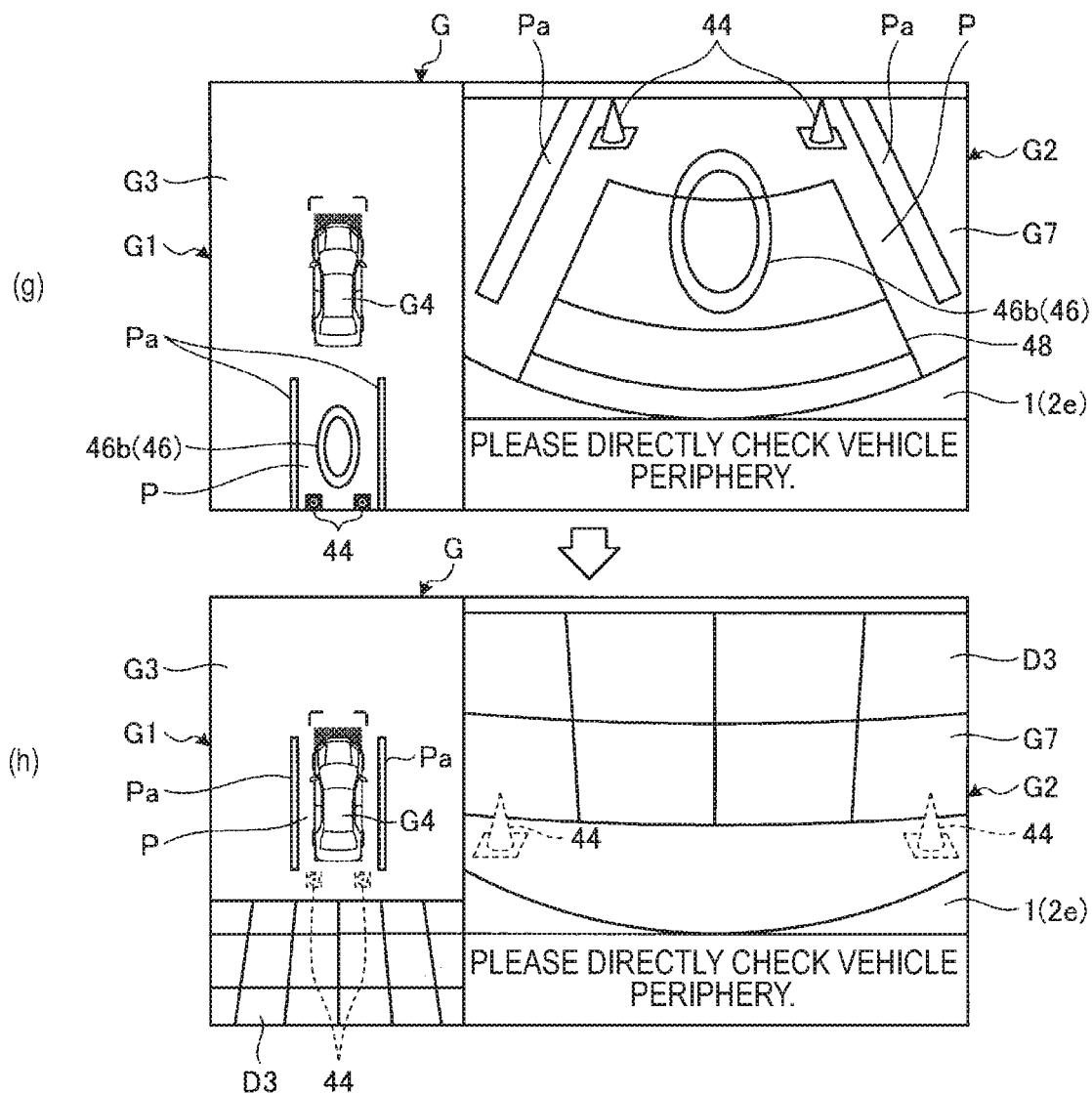
FIG. 15 is an exemplary and schematic view illustrating an example of a display screen by the periphery monitoring device according to the third embodiment, the display screen continuing from FIG. 14.

FIGS. 13 to 15 are exemplary and schematic view illustrating a display screen by the periphery monitoring unit 28 according to a third embodiment. FIGS. 13 to 15 are exemplary and schematic views of a display image displayed on the display device 8 in a case where the vehicle 1 is in the forward traveling state (the shift lever being in the D range) based on the detection result of the shift sensor 21 and the vehicle 1 is at a predetermined speed or lower (e.g., 12 km/h or lower) based on the detection result of the wheel speed sensor 22. In an example of the display image according to the third embodiment, the controller 38 may display, as an indicator indicating the position of the attention area set around the vehicle, a virtual three-dimensional object at an attention position where the vehicle 1 needs to stop. Specifically, in traveling assistance during parking, when the vehicle 1 travels according to the recommended movement route acquired by the route acquisition unit 30*a*, a target position such as the parking completion position or the forward traveling completion position (stop position upon turning traveling) set around the vehicle 1 is an example of the attention area that the driver needs to pay attention. FIGS. 13 to 15 illustrate examples of a display image displayed after the recommended movement route is acquired by the route acquiring unit 30*a*.

In the third embodiment, the display image G displayed on the display device 8 includes the first image G1 and the second image G2. Similarly to the second embodiment, in the first image Cl, the own vehicle image G4 is superimposed and displayed on the peripheral image G3 which is the bird's eye view image of the vehicle 1 generated by the bird's-eye view image generation unit 34 as viewed from directly above. Further, in the second image G2, when the vehicle 1 is in the forward traveling state (the shift lever being in the D range) based on the detection result of the shift sensor 21, the peripheral image G7 which is the bird's-eye view of the vehicle 1 as viewed obliquely from the upper rear side and is enlarged from the peripheral image G3 is displayed together with the own vehicle image G4. When the vehicle 1 is in the reverse traveling state (the shift lever being in the R range) based on the detection result of the shift sensor 21, the actual image showing the rear of the vehicle 1 captured by the imaging unit 15*a* is displayed as the peripheral image G7. In FIGS. 13 to 15, two screens of the first image G1 and the second image G2 are displayed side by side, but the display image G may be configured by one of them or may include three or more screens. Further, the second image G2 is displayed larger than the first image G1 in the case of FIGS. 13 to 15, but the first image G1 may be displayed larger than the second image G2, and the layout of the display image G may be changed appropriately. Hereinafter, an example in which the vehicle 1 is moved to the parking completion position by forward traveling and reverse traveling involving turning traveling will be described with reference to display contents in the timing (a) of FIG. 13 to the timing (h) of FIG. 15.

In the timing (a) in FIG. 13, first, the controller 38 displays a target indicator indicating a target position to which the vehicle 1 needs to move on the display image G according to the recommended movement route acquired by the route acquisition unit 30*a*. Specifically, in the process of guiding the vehicle 1 to a parking area P (the area defined by a parking frame line Pa) including the target position (parking completion position), for example, a substantially circular marker 46*a* as a target indicator 46 is displayed on each of the peripheral image G3 and the peripheral image G7 at a position corresponding to the forward movement completion position of forward traveling performed for turning. Further, the same substantially circular marker 46*b* is displayed on each of the peripheral image G3 and the peripheral image G7 at a position corresponding to the target position (parking completion position). In an example of the peripheral image G7 illustrated in FIG. 13, since the parking completion position is outside the display area, the display of the marker 46*b* is omitted. The target indicator 46 is displayed in, for example, a blue color to indicate that the target indicator 46 is at an approximate position. The target indicator 46 may be displayed such that the contour line thereof is enlarged or reduced over time, similarly to the underfoot indicator G6 described in the first embodiment, may be displayed such that the display color thereof changes or flickers over time similarly to the virtual three-dimensional object 44, or may be displayed as stationary. When the target indicator 46 is displayed, the guidance controller 30*b* first guides the vehicle 1 to the marker 46*a* according to the recommended movement route. The guidance in this case may be fully automatic, semi-automatic, or manual. The parking frame line Pa indicating the parking area P may be recognized by analyzing the captured image data obtained by the imaging unit 15, and the controller 38 may display an indicator indicating the recognized parking frame line Pa. For example, a linear indicator overlapping the parking frame line Pa may be displayed.

Subsequently, as illustrated in the timing (b) of FIG. 13, when the distance between the display position of the target indicator (marker 46*a*) and the display position of the own vehicle image G4 becomes a predetermined value or less (e.g., 2 m or less in the actual distance), the controller 38 displays the virtual three-dimensional object 44 at the target position (stop position). The virtual three-dimensional object 44 may be, for example, a triangular cone, as in the second embodiment. The virtual three-dimensional object 44 may be an indicator indicating, for example, a pole, a flag, or a guidance member as long as it may alert the driver. In this case, the virtual three-dimensional object 44 may be displayed such that the display color thereof changes over time. For example, in the color (R, G, B) of the virtual three-dimensional object 44, (R=0, G=0, B=0) is black. When R, G, and B are each changeable from 0 to 1.0, in a case of changing the virtual three-dimensional object 44 from red to black, G and B are fixed to 0, and R is changed by, for example, the following equations.

$$R=0.5\times(1.0-\sin\theta)$$

$$\theta=2\pi\times(\text{Passed Time ms/Cycle ms})$$

As a result, the reference color of the virtual three-dimensional object 44 is set to (0.5, 0, 0), and the color of the virtual three-dimensional object 44 may linearly change between (1, 0, 0) and (0, 0, 0) over time without any discomfort. As a result, it is possible to perform display that makes it easy for the driver to recognize the target position where the vehicle needs to stop regardless of whether the vehicle 1 is traveling completely automatically, semi-automatically, or manually. The target indicator 46 (marker 46*a*) may be hidden at the time point when the virtual three-dimensional object 44 is displayed. In this case, the display image may be simplified, which may contribute to the improvement of the visibility of the stop position illustrated by the virtual three-dimensional object 44.

The timing (c) in FIG. 13 illustrates the display state of the display image G immediately before the vehicle 1 reaches the target position (the display position of the virtual three-dimensional object 44) during the turning traveling of the vehicle 1 by the guidance of the guidance controller 30*b*. In this way, by displaying the virtual three-dimensional object 44 at the target position, it is possible to perform display that makes it easy for the driver to recognize the target position where the vehicle needs to stop regardless of whether the vehicle is traveling completely automatically, semi-automatically, or manually.

Subsequently, the timing (d) in FIG. 14 illustrates the display state of the display image G when the vehicle 1 reaches the target position (the display position of the virtual three-dimensional object 44) during turning traveling. As illustrated at the timing (d), the controller 38 hides the virtual three-dimensional object 44 when the own vehicle image G4 reaches the target position (the display position of the virtual three-dimensional object 44). As described above, by hiding the virtual three-dimensional object 44, it is possible to perform display that makes it easy for the driver to intuitively recognize that the vehicle 1 reaches the target position (stop position) during turning traveling.

The timing (e) in FIG. 14 is the display state of the display image G when the transmission operation unit 7 is switched from forward traveling to reverse traveling by the guidance of the guidance controller 30b. The switching state of the transmission operation unit 7 may be determined based on the detection result of the shift sensor 21. When the traveling state of the vehicle 1 is switched to the reversible state, the peripheral image G7 of the second image G2 is switched to, for example, an actual image showing a rear area of the vehicle 1 captured by the imaging unit 15a. In the lower area of the actual image showing the rear area, the rear bumper (end 2e) of the vehicle 1 is reflected, and a guide line 48 indicating the reference of a rear distance from the end 2e of the vehicle 1 is displayed at positions of, for example, 0.5 m, 1.0 m, and 2.5 m from the end 2e. When the vehicle 1 is guided completely automatically, the traveling of the vehicle 1 is controlled so that the guide line 48 and the marker 46b coincide with each other. Further, when the vehicle 1 is traveling semi-automatically or manually, the driver will perform a traveling operation so that the guide line 48 and the marker 46b coincide with each other by the guidance of the guidance controller 30b.

Subsequently, as illustrated in the timing (f) of FIG. 14, when the distance between the display position of the target indicator (marker 46b) indicating the parking completion position and the display position of the own vehicle image G4 becomes equal to or less than a predetermined value (e.g., 2 m or less in the actual distance), the controller 38 displays the virtual three-dimensional object 44 at the target position (parking completion position). The virtual three-dimensional object 44 may be a triangular cone similarly to the virtual three-dimensional object 44 illustrated at the target position (stop position) upon forward movement. Further, a virtual three-dimensional object having another shape may be used in order to emphasize that the target position is the parking completion position. The virtual three-dimensional object 44 displayed at the parking completion position may be displayed such that the display color thereof changes or flickers over time, similarly to the virtual three-dimensional object 44 illustrated at the target position upon forward movement. The target indicator 46 (marker 46b) may be hidden at the time point when the virtual three-dimensional object 44 is displayed. In this case, the display image may be simplified, which may contribute to the improvement of the visibility of the stop position illustrated by the virtual three-dimensional object 44.

The timing (g) of FIG. 15 illustrates the display state of the display image G immediately before the vehicle 1 reaches the target position (the parking completion position where the virtual three-dimensional object 44 is displayed) by the guidance of the guidance controller 30b. As described above, by displaying the virtual three-dimensional object 44 at the target position (parking completion position), it is possible to perform display that makes it easy for the driver to recognize the target position where the vehicle needs to stop regardless of whether the vehicle is traveling fully automatically, semi-automatically, or manually.

Subsequently, the timing (h) in FIG. 15 illustrates the display state of the display image G when the vehicle reaches the target position (parking completion position). As illustrated in the timing (h), the controller 38 hides the virtual three-dimensional object 44 when the own vehicle image G4 reaches the target position (parking completion position). In this way, by hiding the virtual three-dimensional object 44, it is possible to perform display that makes it easy for the driver to intuitively recognize that the vehicle 1 reaches the target position (parking completion position). The display image G may be returned to a normal screen (e.g., a navigation screen or an audio screen) after the virtual three-dimensional object 44 is hidden, for example, after a predetermined period has passed.

In the case of the timing (h) in FIG. 15, since a wall D3 is a stationary object, but the vehicle 1 stops based on the virtual three-dimensional object 44, the indicator for the wall D3 may not be displayed. In another embodiment, in order to make it easier to recognize the wall D3, a display mode different from the virtual three-dimensional object 44 indicating the target position (parking completion position), for example, the display mode of the contour line of the virtual three-dimensional object for the wall D3 may be displayed so as to change (e.g., vertically move) over time, or may be displayed in different display colors, as illustrated in the second embodiment.

As described above, according to the third embodiment, the periphery monitoring unit 28 also sets, as the attention area that the driver needs to pay attention, the indicator (virtual three-dimensional object 44) at the target position other than the area where the moving object or the stationary object exists. Then, by changing the display mode of the indicator (virtual three-dimensional object 44) over time, it is possible to realize display that makes it easier for the driver to recognize the target position. Further, as described above, in a case where the vehicle 1 is moved to a desired position, for example, in a case where the vehicle 1 is moved to the parking completion position (target position) for parking or a case where the vehicle 1 is moved to the forward movement stop position (target position) for performing turning traveling for parking, the controller 38 first displays the target indicator (markers 46a and 46b) indicating the approximate position to which the vehicle 1 needs to move and stop. As a result, when the vehicle is far from the target position, the movement of the vehicle 1 may be smoothly and easily executed regardless of the accuracy of alignment. Further, when the vehicle 1 approaches the target position, the controller 38 displays the virtual three-dimensional object 44 at the target position such that the display mode thereof changes over time by an animation display technique. As a result, the target position is clarified by the virtual three-dimensional object 44, so that alignment of the vehicle 1 with the target position may be more accurately performed. Further, since the virtual three-dimensional object is displayed at the time point when the vehicle 1 approaches the target position, it is possible to perform display that makes it easier for the driver to recognize that the vehicle approaches the target position. Further, when the own vehicle image G4 reaches the target position, the virtual three-dimensional object 44 is hidden, so that it is possible to perform display that makes it easy for the driver to intuitively recognize that the vehicle 1 reaches the target position.

When displaying the virtual three-dimensional object 44 which is the indicator for the stationary object described in the second embodiment, the direction indicator G5 or the underfoot indicator G6 which is the indicator for the moving object described in the first embodiment may be displayed. For example, when the moving object approaches the vehicle 1 while the virtual three-dimensional object 44 is being displayed, the display of the direction indicator G5 or the underfoot indicator G6 may be executed. Alternatively, the direction indicator G5 or the underfoot indicator G6 may be displayed instead of the display of the virtual three-dimensional object 44. As a result, it is possible to allow the driver to more clearly recognize the attention area around the vehicle 1. Similarly, the direction indicator G5 or the underfoot indicator G6 may be displayed when the moving body approaches the vehicle 1 even while the indicator of the third embodiment is being displayed. Further, when the stationary object is detected, the virtual three-dimensional object 44 indicating the stationary object may be displayed in addition to the virtual three-dimensional object 44 indicating the target position. In this case, the virtual three-dimensional object 44 indicating the target position and the virtual three-dimensional object 44 indicating the stationary object may be distinguished in different display modes.

A periphery monitoring program executed by the CPU 14a of the present embodiment may be a file in an installable format or an executable format, and may be configured to be provided by being recorded in a computer readable recording medium such as a CD-ROM, a flexible disk (FD), a CD-R, a digital versatile disk (DVD).

Furthermore, the periphery monitoring program may be configured so as to be stored on a computer connected to a network such as the Internet and to be provided by being downloaded via the network. Further, the periphery monitoring program executed in the present embodiment may be configured so as to be provided or distributed via the network such as the Internet.

The embodiments and modifications disclosed here have been described, but these embodiments and modifications are given by way of example and are not intended to limit the scope of the disclosure. These novel embodiments may be implemented in various other forms, and various omissions, replacements, and changes thereof may be made without departing from the spirit of the disclosure. These embodiments and modifications thereof are included in the scope and gist of the disclosure, and are also included in the disclosure described in the claims and the scope of equivalents thereof.

A periphery monitoring device according to an embodiment of this disclosure includes, for example, an acquisition unit configured to acquire a captured image from an imaging unit that captures an image of a periphery of a vehicle and positional information regarding an attention area set around the vehicle and a controller configured to superimpose and display an own vehicle image showing a position of the vehicle and an indicator indicating a position of the attention area based on the positional information on a peripheral image as a bird's-eye view image based on the captured image, and to perform display such that a display mode of the indicator changes over time. According to this configuration, since the display mode of the indicator changes over time regardless of whether or not the attention area moves, it is possible to perform display that makes it easier for the user to recognize the existence or position of the attention area.

In the periphery monitoring device according to the embodiment, for example, the controller may display a virtual three-dimensional object in the attention area as the indicator. According to this configuration, for example, the indicator is three-dimensionalized and displayed as the virtual three-dimensional object. Therefore, it is possible to perform display that makes it easier for the user to recognize the existence or position of the attention area.

In the periphery monitoring device according to the embodiment, for example, the controller may display a target indicator indicating a target position to which the vehicle needs to move, and may display the virtual three-dimensional object at the target position when a distance between the target position and a display position of the own vehicle image becomes equal to or less than a predetermined value. According to this configuration, when moving the vehicle to a desired position, for example, when moving the vehicle to a parking target position for parking or when performing turning for parking, the target indicator indicating an approximate position to which the vehicle needs to move and stop, is first displayed. Then, when the vehicle approaches the target position, the virtual three-dimensional object is displayed at the target position. As a result, when the vehicle is far from the target position, the vehicle may be moved smoothly and easily regardless of the accuracy of alignment. Further, the virtual three-dimensional object that clearly shows the target position is displayed when the vehicle approaches the target position, so that alignment with the target position may be performed more accurately. Further, since the virtual three-dimensional object is displayed at the time point when the vehicle approaches the target position, it is possible to perform display that makes it easy for the user to recognize that the vehicle approaches the target position.

In the periphery monitoring device according to the embodiment, for example, the controller may hide the virtual three-dimensional object when the own vehicle image reaches the target position. According to this configuration, it is possible to perform display that makes it easy for the user to intuitively recognize that the vehicle reaches the target position.

In the periphery monitoring device according to the embodiment, for example, the controller may change a display mode of the virtual three-dimensional object over time. According to this configuration, for example, it is possible to perform display that makes it easy to distinguish the virtual three-dimensional object from an actual object.

In the periphery monitoring device according to the embodiment, for example, the controller may perform display such that a display mode of a contour line of the indicator changes over time. According to this configuration, it is possible to more clearly display that the display mode of the indicator changes over time and to perform display that makes it easier to recognize the existence or position of the attention area.

In the periphery monitoring device according to the embodiment, for example, the controller may perform display such that the contour line moves over time within a predetermined display area so as to indicate a direction in which the attention area moves. According to this configuration, it is possible to perform display that makes it easier to image, for example, the existence of the attention area, the movement of the attention area, and the moving direction of the attention area.

In the periphery monitoring device according to the embodiment, for example, the controller may display the indicator in a portion that is able to be considered as a lowermost portion of a three-dimensional object when it is conceivable that the three-dimensional object exists in the attention area. According to this configuration, for example, it is possible to perform display that makes it easy to recognize the lowermost portion (underfoot or a base) of the three-dimensional object, to makes it easy to image the spacing (distance) between the position of the lowermost portion (e.g., the contact position with the road surface) and the vehicle (own vehicle image), and to makes it easier to recognize a relative positional relationship between the attention area (three-dimensional object) and the vehicle.

In the periphery monitoring device according to the embodiment, for example, the controller may enlarge or reduce a size of the contour line of the indicator over time. According to this configuration, for example, it is possible to perform display that makes it easier to recognize the lowermost portion (underfoot or a base) of the three-dimensional object.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring device comprising:
    an acquisition unit configured to acquire a captured image from an imaging unit that captures an image of a periphery of a vehicle and positional information regarding an attention area including an object set around the vehicle; and
    a controller configured to superimpose and display an own vehicle image showing a position of the vehicle, a position of the object and an indicator indicating a position of the attention area based on the positional information on a peripheral image as a bird's-eye view image based on the captured image, and to perform display such that a display mode of the indicator changes over time,
    wherein the indicator and the object are each shown in a different position of the display and the indicator indicates a direction of approach of the object.

2. The periphery monitoring device according to claim 1, wherein
    the controller displays a virtual three-dimensional object in the attention area as the indicator.

3. The periphery monitoring device according to claim 2, wherein
    the controller displays a target indicator indicating a target position to which the vehicle needs to move, and displays the virtual three-dimensional object at the target position when a distance between the target position and a display position of the own vehicle image becomes equal to or less than a predetermined value.

4. The periphery monitoring device according to claim 3, wherein
    the controller hides the virtual three-dimensional object when the own vehicle image reaches the target indicator.

5. The periphery monitoring device according to claim 2, wherein
    the controller changes a display mode of the virtual three-dimensional object over time.

6. The periphery monitoring device according to claim 1, wherein
    the controller performs display such that a display mode of a contour line of the indicator changes over time.

7. The periphery monitoring device according to claim 6, wherein
    the controller performs display such that the contour line moves over time within a predetermined display area so as to indicate a direction in which the attention area moves.

8. The periphery monitoring device according to claim 6, wherein
    the controller displays the indicator in a portion that is able to be considered as a lowermost portion of a three-dimensional object when it is conceivable that the three-dimensional object exists in the attention area.

9. The periphery monitoring device according to claim 8, wherein
    the controller enlarges or reduces a size of the contour line of the indicator over time.

10. The periphery monitoring device according to claim 1, wherein the display mode of the indicator changes over time by animating the indicator.

* * * * *